(12) United States Patent
Hornsby et al.

(10) Patent No.: US 11,601,434 B1
(45) Date of Patent: Mar. 7, 2023

(54) SYSTEM AND METHOD FOR PROVIDING A DYNAMICALLY RECONFIGURABLE INTEGRATED VIRTUAL ENVIRONMENT

(71) Applicant: Trace Systems, Inc., Vienna, VA (US)

(72) Inventors: Scott Lee Hornsby, Riverview, FL (US); Kenneth Hilton, Hudson, FL (US)

(73) Assignee: TRACE SYSTEMS, INC., Vienna, VA (US)

(*) Notice: Subject to any disclaimer, the term of this patent is extended or adjusted under 35 U.S.C. 154(b) by 210 days.

(21) Appl. No.: 17/119,394

(22) Filed: Dec. 11, 2020

Related U.S. Application Data

(60) Provisional application No. 62/947,336, filed on Dec. 12, 2019.

(51) Int. Cl.
| | |
|---|---|
| *H04L 29/06* | (2006.01) |
| *H04L 9/40* | (2022.01) |
| *H04L 12/46* | (2006.01) |
| *G06F 9/455* | (2018.01) |

(52) U.S. Cl.
CPC ........ *H04L 63/101* (2013.01); *G06F 9/45558* (2013.01); *H04L 12/4633* (2013.01); *H04L 63/0236* (2013.01); *H04L 63/0435* (2013.01); *H04L 63/20* (2013.01); *G06F 2009/45587* (2013.01); *G06F 2009/45595* (2013.01)

(58) Field of Classification Search
CPC ............... H04L 63/101; H04L 63/0236; H04L 63/0435; H04L 63/20; H04L 63/0272; H04L 63/164

USPC .............................................................. 726/4
See application file for complete search history.

(56) References Cited

U.S. PATENT DOCUMENTS

| | | | | |
|---|---|---|---|---|
| 7,444,341 | B2* | 10/2008 | Riedle ................. | G06F 9/44505 |
| 10,616,339 | B2* | 4/2020 | Nagalla ............... | H04L 67/1097 |
| 10,749,740 | B2* | 8/2020 | Saxena ............... | H04L 41/0803 |
| 11,272,267 | B2* | 3/2022 | Herdrich ................. | H04Q 9/02 |
| 2017/0085413 | A1* | 3/2017 | Cencini ................... | G06F 1/189 |
| 2018/0013583 | A1* | 1/2018 | Rubenstein ......... | H04L 12/4633 |
| 2019/0229987 | A1* | 7/2019 | Shelke ............... | H04L 41/0866 |

* cited by examiner

*Primary Examiner* — Longbit Chai
(74) *Attorney, Agent, or Firm* — Bass, Berry & Sims PLC; Shu Chen

(57) ABSTRACT

The present disclosure relates to a system, comprising: a first server computing device configured to store various application data relating to the system, and control a first plurality of modules to simultaneously establish multiple logically separate and secure networks within a self-supported computing environment; a second server computing device configured to control a second plurality of modules to perform out-of-band management of the system; and a third server computing device configured to control a third plurality of modules to control inbound and outbound data traffic of the logically separate and secure networks. The system is scalable by at least adding additional one or more first server computing devices to host additional application data within the self-supported computing environment's secure configuration and logical separation of networks while maintaining the second and third server computing devices.

18 Claims, 13 Drawing Sheets

SYSTEM AND METHOD FOR PROVIDING A DYNAMICALLY RECONFIGURABLE INTEGRATED VIRTUAL ENVIRONMENT

CROSS REFERENCE TO RELATED APPLICATION

This application claims priority to U.S. Provisional Patent Application No. 62/947,336 filed on Dec. 12, 2019, entitled "SYSTEM AND METHOD FOR PROVIDING A DYNAMICALLY RECONFIGURABLE INTEGRATED VIRTUAL ENVIRONMENT," the content of which is incorporated by reference herein in its entirety.

FIELD OF TECHNOLOGY

The present disclosure generally relates to systems and methods for providing a dynamically reconfigurable integrated virtual computing environment or platform, and more particularly relates to a configuration of a hardware platform for expanding multiple secure virtual networks hosting capabilities across a converged infrastructure managed systems and subsystems to provide information sharing capabilities among unilateral, bilateral and multilateral stakeholders.

BACKGROUND

Networks involving securely exchanging information among multiple separate bilateral and/or multilateral external stakeholders via, e.g., data separation has historically been limited to physically separating hardware components for validating information separation. Cloud computing efficiencies, within software defined networks and software defined data centers, are therefore not realized to the maximum extent practicable due to physical separation requirements for secure cryptographic network information sharing. Often, policies require physical separation based on the sensitivity levels specified by the governing organization.

Accordingly, there is a need for enabling multiple networks to be configured and dynamically re-provisioned on a single platform environment to support autonomous and simultaneous network hosting with secure cryptographic separation of data.

SUMMARY

Among other features, the present disclosure provides a system, comprising: a first server computing device, comprising: a first non-transitory computer-readable storage medium configured to store a first set of instructions and application data relating to the system, and a first processor coupled to the first non-transitory computer-readable storage medium and configured to control a first plurality of modules to execute the first set of instructions for simultaneously establishing a plurality of logically separate and secure networks within a self-supported computing environment; a second server computing device, comprising: a second non-transitory computer-readable storage medium configured to store a second set of instructions, and a second processor coupled to the second non-transitory computer-readable storage medium and configured to control a second plurality of modules to execute the second set of instructions for performing out-of-band management of the system; and a third server computing device, comprising: a third non-transitory computer-readable storage medium configured to store a third set of instructions, and a third processor coupled to the third non-transitory computer-readable storage medium and configured to control a third plurality of modules to execute the third set of instructions for controlling inbound and outbound data traffic of the plurality of logically separate and secure networks, wherein the system is scalable by at least adding additional one or more first server computing devices to host additional application data within the self-supported computing environment's secure configuration and logical separation of networks while maintaining the second and third server computing devices.

In one embodiment, the present disclosure relates to a non-transitory computer-readable storage medium having instructions embodied therein that when executed cause a computer system to perform: storing a first set of instructions and application data relating to the computer system on a first non-transitory computer-readable storage medium of a first server computing device of the computer system; executing the first set of instructions, by a first processor of the first server computing device coupled to the first non-transitory computer-readable storage medium, to simultaneously establish a plurality of logically separate and secure networks within a self-supported computing environment; storing a second set of instructions on a second non-transitory computer-readable storage medium of a second server computing device of the computer system; executing the second set of instructions, by a second processor of the second server computing device coupled to the second non-transitory computer-readable storage medium, to perform out-of-band management of the system; storing a third set of instructions on a third non-transitory computer-readable storage medium of a third server computing device of the computer system; executing the third set of instructions, by a third processor of the third server computing device coupled to the third non-transitory computer-readable storage medium, to control inbound and outbound data traffic of the plurality of logically separate and secure networks; and adding additional first server computing devices to the computer system to host additional application data within the self-supported computing environment while maintaining the second and third server computing devices.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
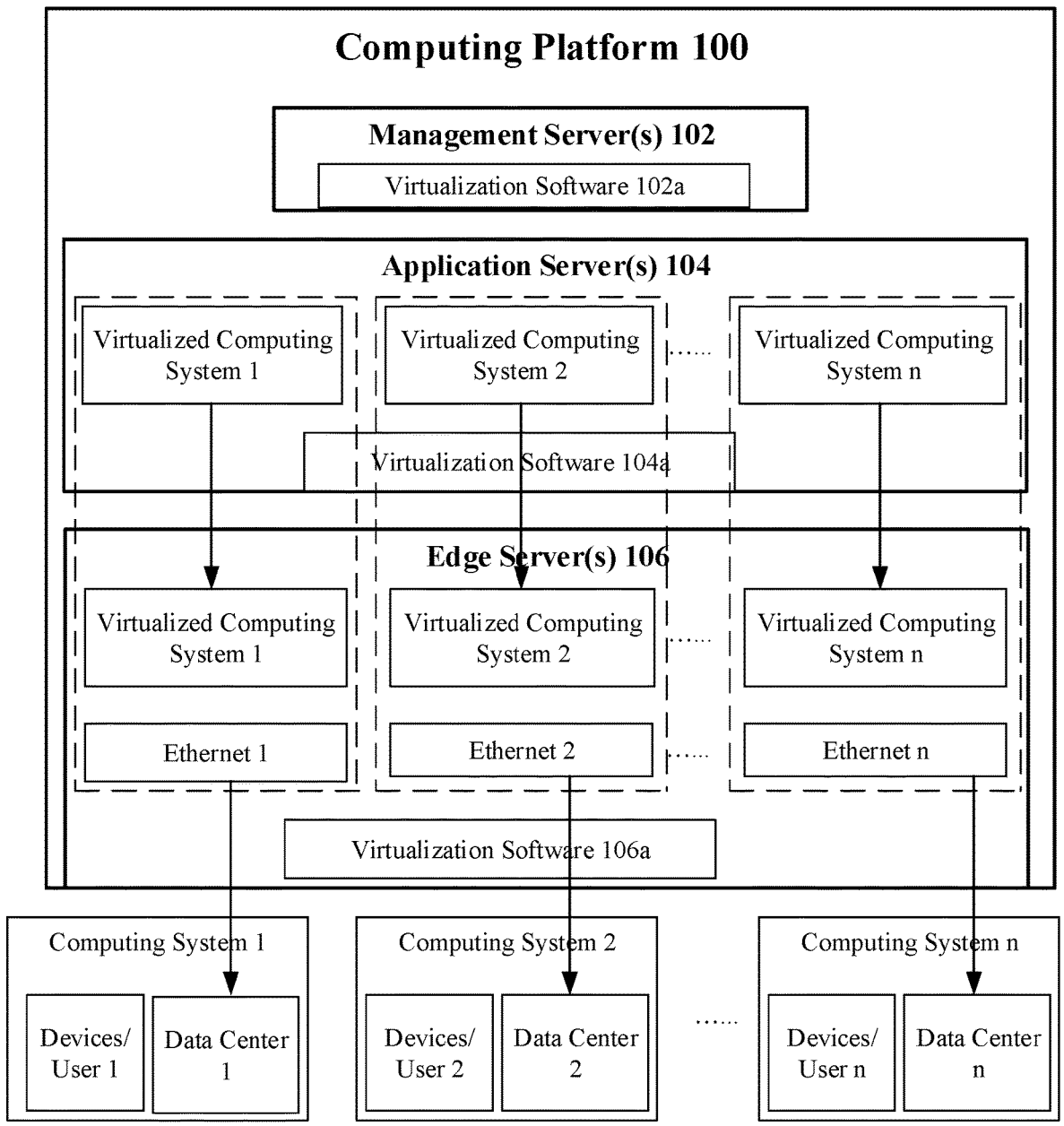
FIG. 1 illustrates a block diagram of a computing platform, according to an exemplary aspect of the present disclosure.

Various aspects of invention will be described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below.

Recent technology advancement to combine network connectivity, compute capacity, memory and file storage across common infrastructure has resulted in convergence of information technology hardware to reduce size, weight and power across components required to support information sharing systems. For example, a hardware approach to software defined networks generally requires utilizing network virtualization technologies such as a bare metal hypervisor to share memory, processing and storage resources across physically separate hardware components.

When running a single physical network, efficiencies may be securely leveraged across separate hardware components residing within the same network. Complexities due to secure information separation may be introduced if more than one network is hosted and accessible via certain hyper-converged infrastructure components (e.g., HCI servers or computing devices) as each network would have access to all hardware devices that are coupled together. It is undesirable to configure, host and maintain multiple infrastructure networks across physically separate hardware due to the inability to efficiently provision new networks without additional hardware. Networking, computing and storage resources are generally not fully allocated for each system to ensure efficient processing utilization for user operations which creates a pool of excess overall system resources that are not realized due to physical cryptographic system constraints with multiple networks that may require physical separation.

Accordingly, it is desirable to validate and maintain secure network and data separation within a hyper-converged environment in a logical and virtual configuration to provide the same level of security as if the system being deployed contained physically separate hardware components without the loss of unutilized processing, memory and storage resource pools.

On a high level, the present disclosure provides a secure configuration and integration of hardware and software components to utilize total system resources to operate multiple simultaneous virtualized networks; and the ability to pre-stage networks for dynamic provisioning and swapping (e.g., hot swapping which may relate to the replacement or addition of components to a computing system without stopping, shutting down, or rebooting the computing system) of hosted active and inactive networks. Aspects of the present disclosure may relate to ensuring secure cryptographic separation of data within multiple simultaneous networks within one hyper-converged infrastructure environment.

As will be described fully below, the present disclosure generally relates to a pre-integrated computing platform configured to provide multi-tenant isolation of virtualized networks using software defined networking technologies and a hyper-converged infrastructure to realize secure network virtualization. The disclosed computing platform may be configured to host multiple virtualized networks data centers on a single platform and provide consolidated data center services applicable to industry best practices and cybersecurity risk thresholds for such virtualized networks. One of the primary objectives of the disclosed computing platform may include improving system performance, reducing the time needed to swap out (turn on/turn off) virtualized networks, and providing for rapid expansion, modification, or deprecation of virtualized networks.

FIG. 1 is a block diagram of a computing platform 100, according to aspects of the present disclosure. In one embodiment, computing platform 100 may include one or more management servers 102, one or more application servers 104, and one or more edge servers 106. Among other features, computing platform 100 may be configured to pre-stage existing computing systems (e.g., a portion of computing systems 1-$n$) based on known standards and specifications, create a new computing system (e.g., one of computing systems 1-$n$) based on pre-positioned templates, host multiple concurrent operational computing systems, ensure a secure separation of virtualized networks, host stand-by computing systems (e.g., a portion of computing systems 1-$n$), and dynamically swap between computing systems that are active or in stand-by. Such computing systems may be scalable by at least adding additional application servers 104 to host additional application data within a self-supported computing environment's secure configuration and logical separation of networks while maintaining management servers 102 and edge servers 106. A self-supported computing environment may include the ability for the entirety of such computing systems to run without needing any outside connectivity for services. All resources necessary to function may be completely contained within the physical and virtual infrastructure of such computing systems. Each computing system 1-$n$ and computing platform 100 may be communicatively coupled over a network (e.g., Ethernet), such that each computing system 1-n may be configured to access functionality and/or use some of resources of a virtualized environment provided by computing platform 100.

Each management server 102, application server 104, and edge server 106 may be constructed on a hardware platform (not shown) including one or more central processing units (CPUs), system memory, and storage. The hardware platform may also include one or more network interface controllers (NICs) that connect each server 102, 104, 106 to a network, and one or more host bus adapters (HBAs) that connect each server 102, 104, 106 to a persistent storage unit. Further, for each management, application, and edge servers 102, 104, 106, virtualization software, or firmware or hardware 102a, 104a, 106a may be respectively installed on top of the hardware platform of each server and support a VM execution space within which one or more virtual computing systems 1-n may be concurrently instantiated and executed. In one embodiment, each virtual computing systems 1-n may be configured to implement a virtual hardware platform that supports the installation of a guest operating system (OS) for at least executing various applications. In some embodiments, each virtualization software 102a, 104a, 106a may include a virtualization kernel component controlling a plurality of virtualization sub-components. Each virtualization sub-component may correspond to each of a plurality of instantiated VMs. Alternatively, each virtualization sub-component may be considered to be a part of its corresponding VM as each virtualization sub-component may include hardware emulation modules for its corresponding VM. It should be appreciated that techniques described herein may be applicable to hosted virtualized computing systems 1-n or certain non-virtualized computer systems. Further, various computer system configurations for each server 102, 104, 106 may be implemented including hand-held devices, microprocessor systems, microprocessor-based or programmable consumer electronics, minicomputers, mainframe computers, etc.

Virtualized computing systems 1-n may be logically grouped by any of server 102, 104, 106 for a particular workload when an application is executed. The computing systems 1-n in each logical group may execute instructions alone or in combination with one another, for example in a disturbed manner. The virtualization infrastructure established by computing platform 100 may also include a plurality of virtual datacenters (not shown). A virtual datacenter may refer to an abstract pool of resources (e.g., memory, CPU, storage), and a virtual data center may be implemented on one or some combination of physical devices.

In some embodiments, computing systems 1-n may be deployed in a cloud environment, built upon a virtualized environment provided by computing platform 100. As shown in FIG. 1, each computing systems 1-n may be located in an Internet connected data centers 1-n or a private cloud computing center coupled with one or more public and/or private networks. Devices and users in each computing system 1-n, in one embodiment, may couple with a virtual or physical entity through a network connection which may be a public network connection, private network connection, or some combination thereof. For example, a user may access a web page or application presented by one of computing systems 1-n at a workstation which may be a virtual or physical entity.

One or more embodiments of the present disclosure may be implemented as one or more computer programs or as one or more computer program modules embodied in one or more computer readable media. The term "computer readable medium" refers to any suitable data storage device that can store data which can thereafter be input to a computer system. Computer readable media may be based on any existing or subsequently developed technology for embodying computer programs in a manner that enables them to be read and executed by a computer. Example computer readable medium may include a hard drive, network attached storage, read-only memory, random-access memory (e.g., a flash memory device), a compact discs, CD-ROM, a CD-R, or a CD-RW, a digital versatile disc, a magnetic tape, and other optical and non-optical data storage devices. In one embodiment, the computer readable medium may also be distributed over a network coupled computer system so that the computer readable code is stored and executed in a distributed fashion.

In accordance with aspects of the present disclosure, each management server 102, application server 104, and edge server 106 of computing platform 100 may be a hyperconverged computing device including pre-tested, pre-configured and pre-integrated storage and network components located in an enclosure. Each server 102, 104, and 106 may be scaled to add more computing nodes, each node including a CPU, memory and storage. In some embodiments, each computing node may be considered as a server and configured to independently host a number of virtualized computing systems 1-n. All computing nodes in each server 102, 104, and 106 may be independent of one another, and may not be required to share any functionality with one another. Each server 102, 104, and 106 may include various external interfaces (e.g., universal serial bus (USB) ports) and at least one graphical user interface module having codes or instructions stored thereon for creating and managing all components of each server 102, 104, and 106.

As shown in FIG. 1, each virtual computing systems 1-n inside computing platform 100 may be configured to have its own switching and routing capabilities unique to services of computing systems 1-n. Physical access to virtual computing systems 1-n may be provided by edge server 106. In one embodiment, edge server 106 may be configured to provide a connection from the multi-tenant computing platform 100 to a separate physical infrastructure via a single or pair of network cables.

In some embodiments, as shown in FIG. 1, each of computing systems 1-n may include various devices/user and a data center. The devices may include any number of physical and/or VMs. The physical and/or VMs may include a variety of applications (e.g., operating systems). The physical and/or VMs may have the same installed applications or may have different installed applications or software. The installed software may be one or more software applications from one or more vendors.

As a high level system design overview, three interlocking layers of system protection may be used to secure computing platform 100: 1) computing platform 100 itself, which includes hardware and software components; 2) unique system security and hardening for various system hardware and software components; and 3) dedicated virtualized encrypted tunnels configured to keep individual virtualized computing systems 1-n communications secure and separate.

As will be described fully below and in accordance with important aspects of the present disclosure, computing platform 100 may include a family of products and services deployed within a communication network to provide a stable, secure information processing environment in which multiple virtualized systems or networks may be kept completely separate from one another. For example, computing platform 100 may be configured to provide a multi-tenant data center using certain virtualization software (e.g., virtualization software 102a, 104a, and 106a) at its core for server virtualization, software defined networking functionality for network virtualization, and a host of other products and services to ensure a stable and secure platform. By providing local data center services, end users may be provided with full access to the functionality provided by respective virtualized networks while having no direct access to computing platform 100 itself.

In one embodiment, Ethernets 1-n in FIG. 1 may include a physically separated local area networks (LANs) infrastructure dedicated to each of a number of active computing systems 1-n for implementing, such as, authentication services, E-mail, chat, and web services. The LAN may be configured to maintain a physically separated infrastructure and separate approval boundaries. Each network's system administrators and users may access computing system resources from individual end user access devices. In addition to edge server 106 which is configured to provide external physical communication connections to the virtualized networks 1-n, computing platform 100 may include multiple infrastructure switches for internal platform communication.

Further, computing platform 100 may include dedicated encrypted tunnels having a variety of system components configured to provide the ability to securely host multiple virtualized networks on a single hardware/software platform. As shown in FIG. 1, each dedicated encrypted tunnel may provide a multi-tiered protective boundary around network traffic as it traverses the system. As a result, the contents and the communication of each virtualized networks may be isolated from all other networks.

Figure 2:
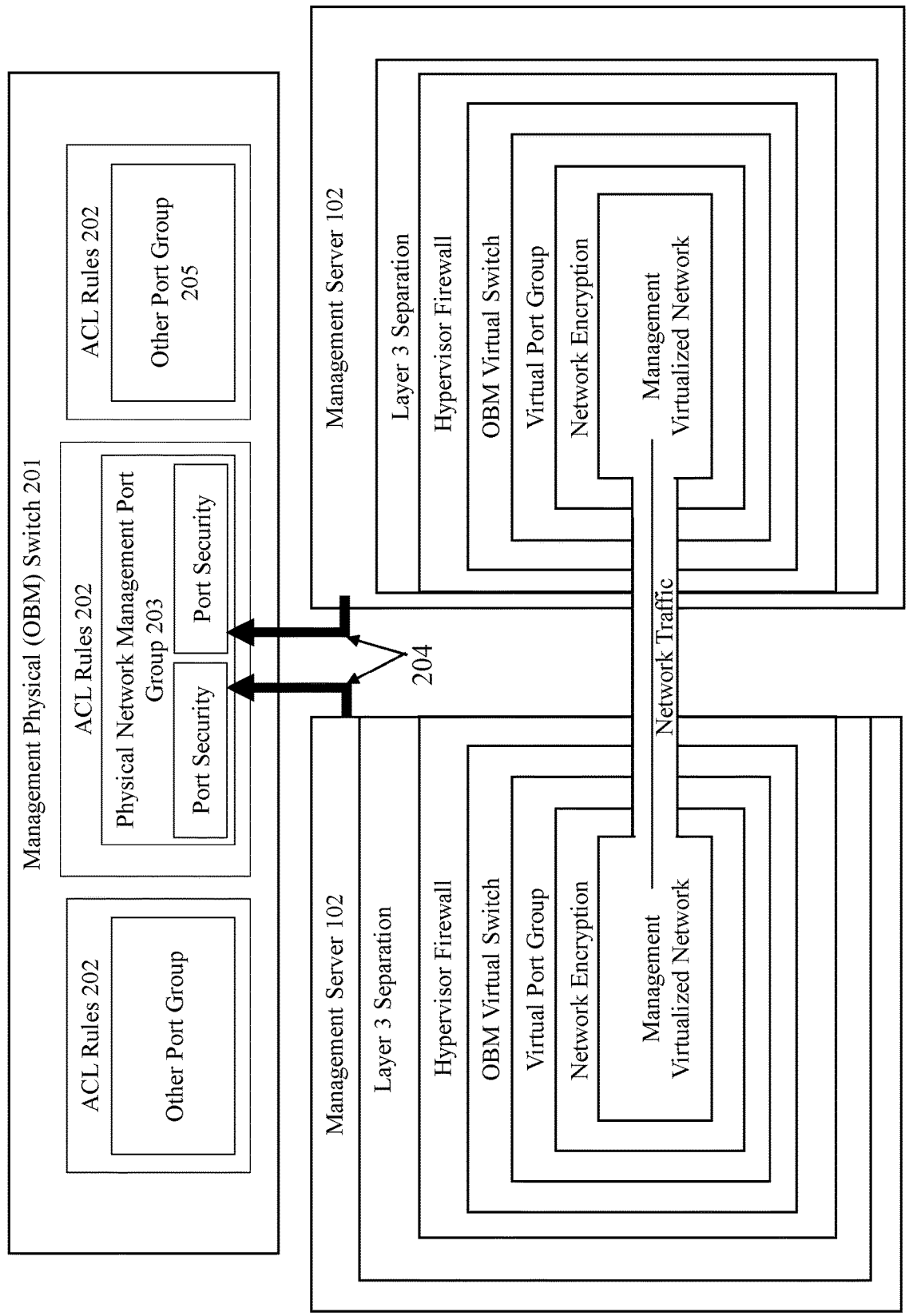
FIG. 2 illustrates management components of the computing platform and that management components are physically separated from data components, according to an exemplary aspect of the present disclosure.

FIG. 2 illustrates management components of the computing platform 100 of FIG. 1 and that a management switch 201 and management servers 102 are physically separated from data switch (e.g., data switch 501 of FIG. 5) and data host components (e.g., application servers 104 of FIG. 1), according to aspects of the present disclosure. In one embodiment, management functions (administration, policies, etc.) may be performed on management servers 102 in FIG. 1 and not the application servers 104. The management servers 102 may be connected to a physical management switch (out-of-band management (OBM)) 201. Access control lists (ACL) rules 202 may be pre-provisioned on the computing platform 100 to establish exception-only-traffic (e.g., traffic that conforms to security policies and ACL rules) that is aligned with management and control plane data. That is, data traffic that does not meet security requirements or pre-provisioned ACL rules may be rejected by default. Only data traffic that is conformed to security policy criteria may be allowed. Physical network management port group 203 may be configured to verify that all virtualized network data in transit is isolated and secured from all other external domains. The physical management switch 201 may be connected to the management servers 102 through physical cabling 204 that are connected to pre-provisioned ports authorized to transmit system policy verified OBM data traffic. Any other network communication 205 not related to the administration of the system may be designated to be pre-provisioned (e.g., storage).

Computing platform 100 may be configured to allow for expansion of maximum system capacity to meet evolving mission requirements. In one aspect, designed for modular scalability, computing platform 100 may be configured to add processing, storage, network connectivity, memory, or other capacity over time without altering design components. To increase capacity, additional hardware may be integrated into the hyper-converged environment while maintaining its core security architecture.

The modularized design of computing platform 100 may be configured to provide replacement or retirement of parts or systems without fundamentally breaking its security posture. Failure of a single component may not create a security violation or allow for unauthorized data transfers, inspections, or data exports. Computing platform 100 has resiliency without the excess redundancy that may artificially increase the size, footprint, or size, weight and power (SWaP) limitations of the system.

The hardware and software components used to create and secure computing platform 100 may be selected to ensure at least platform stability, platform security, and platform system separation.

In one important aspect, computing platform 100 may be contemplated in accordance with the redundant, always invoked, independent implementations, non-bypassable (RAIN) security architecture requirements.

Specifically, with respect to redundancy, security-relevant components, including filters and domain separation, may be invoked twice for each unique function. Redundancy here may not mean the components being invoked are independent implementations. Rather, the components may be invoked or implemented at multiple layers twice. For example, the disclosed platform architecture may include redundant and layered security capabilities to direct data and information flow to pass multiple checkpoints.

Computing platform 100 may be configured to ensure that key security relevant components are handled across multiple subsystems. No single system failure can allow a violation event. In other words, traffic may not pass between networks if one or more components of platform 100 have failed. Redundancy may be implemented for security-relevant components by clustering of hardware for both the management and application domains. Further, dual port NICs may be deployed at edge server 106, and VMs in management server 102 may have primary and secondary VMs, such as RBAC rights management tools, management, and an SDN cluster spread across three VMs.

Next, "always invoked" may require security-relevant components (especially filters) are always executed, and best implemented in a pipeline design pattern with a linear flow. Here, filters may refer to distributed firewalls or encryption routing technology that filter and/or block data communication. Filters may be implemented at every single workload within the disclosed computing platform system. Always invoked may be implemented with two or more components (usually filters) in parallel, which may make achieving a non-bypassable design more complex.

In some embodiments, certain components of computing platform 100 may provide domain separation within the integrated platform configuration. For example, filters may not be bypassed and are required for hosting of a specific service. The software defined networking platform may be responsible for facilitating the network traffic as well as implementing security controls. If the specific service fails, the component may fail safe, disallowing network communication.

As a second layer of system protection, security hardening and configuration ensures that all aspects of computing platform 100 are secure and utilize defense-in-depth throughout their implementation.

As the third layer of system protection, dedicated encrypted tunnels may be implemented in computing platform 100 to represent all of software defined data center (SDDC) components that provide security relevant services to the access portion of the SDDC. This is a superset of features, tools, and settings that provide the network separation and isolation for the virtualized networks. One of the functions of dedicated encrypted tunnels may include maintaining the virtualized networks communication and contents securely separated from each other. Each portion of the dedicated encrypted tunnel may be configured to provide an interlocking piece of the platform security configuration. Failure of a single component does not compromise the integrity of other components.

Configuration of the components may be managed across separate subsystems with differing authentication and management mechanisms including: hypervisor, SDN, physical network management and data switches, management, RBAC rights management tools, and active directory. In one embodiment, a dedicated encrypted tunnel may be preconfigured to work with each of the system's potential network or domain (computing systems 1-n in FIG. 1). A network administrator may manage visible network VM instances associated with each specific network but cannot configure or modify the platform dedicated encrypted tunnel.

In one embodiment, dedicated encrypted tunnels may be configured to remain in a static configuration regardless of the virtualized networks utilizing the dedicated encrypted tunnel. Dedicated encrypted tunnels may contain no virtualized networks-specific data configurations. The dedicated encrypted tunnels acts as a neutral boundary, preventing data in a domain from traversing outside of the domain's logical boundary.

Figure 3:
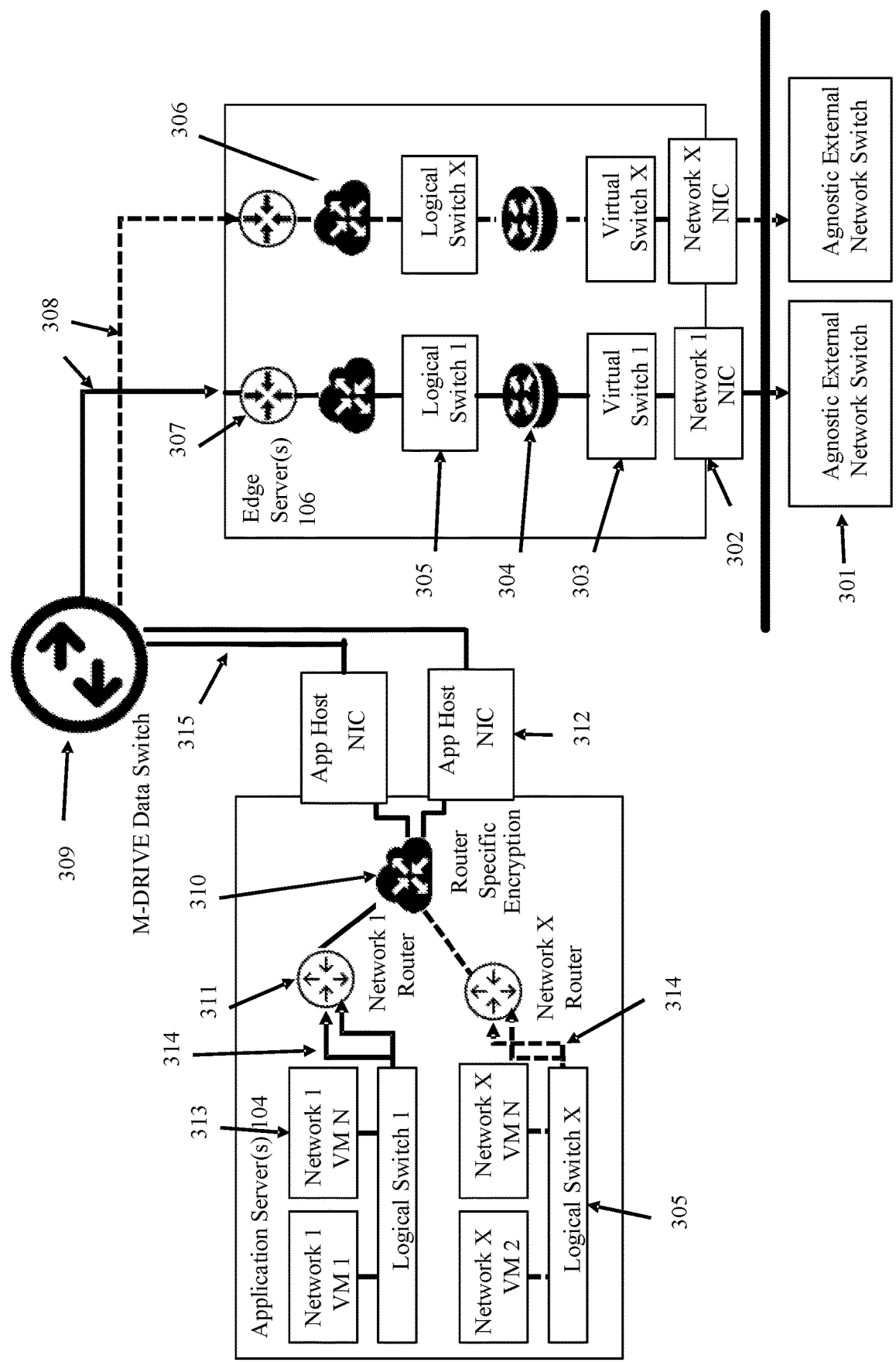
FIG. 3 illustrates a high-level dedicated encrypted tunnel concept, according to an exemplary aspect of the present disclosure.

FIG. 3 shows a high-level dedicated encrypted tunnel that may be established, e.g., via application server(s) 104 and edge server(s) 106 of FIG. 1, in accordance with aspects of the present application. In one embodiment, an end to end process for data traversing the disclosed system may involve the following:

1. Data may be transmitted through an external network switch 301 that may be physically connected to the computing platform 100 at one or more physical network interface cards (NIC) 302 which may be processed through at least one virtual switch 303 that corresponds to its physical NIC.

2. The virtual switch 303 may be configured to transmit data to a network specific service router 304 which may be the single logical outermost edge of the datacenter. Router 304 may be configured to provide security controls to block unapproved traffic in accordance with pre-provisioned computing platform security policies. Once approved, data may be passed to a network specific logical switch 305 to connect with the service router and SDN capabilities.

3. Virtualized encryption may then be applied to data 306 and network specific Tier 1 router 307 which may be configured to provide encapsulation and routing across cables 308 to the physical data switch 309.

4. Data switch 309 may be configured to enable physical connectivity between the edge server(s) 106 in FIG. 1 and pass data traffic to the application server(s) 104 via dedicated data switch NIC 312 and the network specific encryption routing 310 implemented on the application server(s) 104.

5. Network specific encryption routing 310 and network specific router 311 may be configured to pass only approved authorized data to the network specific logical switch for access to network VMs 313, according to an embodiment of the present disclosure.

6. All data traversing the computing platform 100 may be encrypted using encryption modules 314 from the VMs 313 and across physical infrastructure cables 315 into and out of the physical data switch 309.

7. Data into and out of the computing platform system 100 will always occur at the edge NIC 302 and into an external physical switch 301 for transmission to external destination address.

The following table describes the components of the dedicated encrypted tunnel in FIG. 3. Here, East/West traffic may denote a direction of traffic flow between VMs within the disclosed computing platform. Based on a selected system topology deployed within a data center, East/West traffic may indicates the flow of data between the application servers (e.g., application server(s) 104 of FIG. 1). As a result of virtualization within the disclosed computing platform and hyper-converged infrastructure, East/West traffic may indicate that enclave virtual workloads attached to virtual networks that communicate strictly within the scope of the application server(s) 104. In one embodiment, East/West traffic may include all SDN components such as virtual firewalls, load balancers and enclave encryption methods.

Further, when data must enter or exit the disclosed computing platform, the flow of data may be defined as North/South traffic, which may indicate a data flow that either enters or leaves a corresponding data center from or to a system physically residing outside the computing system. In one embodiment, all traffic flowing North/South may traverse from the origination or destination of a server (e.g., application server(s) 104 of FIG. 1) through another server (e.g., edge server(s) 106 of FIG. 1) then arriving on the physical network device external to the system's boundary.

| # | Device | Description |
| --- | --- | --- |
| 301 | Virtualized network switch (network specific) | Represents the virtualized networks LAN portion of the physical network infrastructure. |
| 302 | Network-specific edge NIC | Connected to the network switch, these NICs (two per virtualized networks for resiliency) are dedicated to a single network. A virtual NIC (vNIC) is connected to the physical NIC (hypervisor kernel). |
| 303 | Network-specific virtual standard switch | Provides virtual connectivity between the virtualized networks. |
| 304 | Network-specific service router | Acts as the single logical outermost edge of the data center. Provides a dedicated network-specific software firewall that restricts traffic in accordance with approved ports, protocols, and services. Additionally, a dedicated edge VM firewall whitelists approved ports and protocols and blocks all other traffic. |
| 305 | Network-specific logical switch | Provides connectivity between the service router and SDN-based routing on the edge server(s) 106 |
| 306 | Network-specific encryption | In conjunction with the Tier 1 router, provides routing on edge server 106 and East/West virtualized encryption |
| 307 | Network-specific Tier 1 router | Provides North/South encapsulation and routing on the edge server 106 |
| 308 | Physical cabling | The Hypervisor infrastructure is connected via a protected cable infrastructure secured inside the data center rack. |
| 309 | Physical switch | Provides connectivity between servers 102 and 104 that part of computing platform 100. The ports that are used to provide East/West connectivity are isolated from other traffic traversing the switch. |

-continued

| # | Device | Description |
|---|---|---|
| 310 | Network-specific Encryption | Provides routing on application servers 104 and virtualized network encryption. |
| 311 | Network-specific Tier 1 router | Provides North/South encapsulation and routing on application servers 104 |
| 312 | Network-specific virtual standard switch | Connected via the infrastructure to application servers 104 |
| 313 | Network-specific virtual machine | Built and managed to platform architecture standard |
| 314 | Network-specific encrypted virtual traffic | All East/West and North/South traffic that traverses the infrastructure switch is encrypted using commercial-off-the-shelf based encryption modules |
| 315 | Transport Zone | The encrypted tunnel for all enclave data connections from the physical infrastructure data switch to the edge host |

Figure 4:
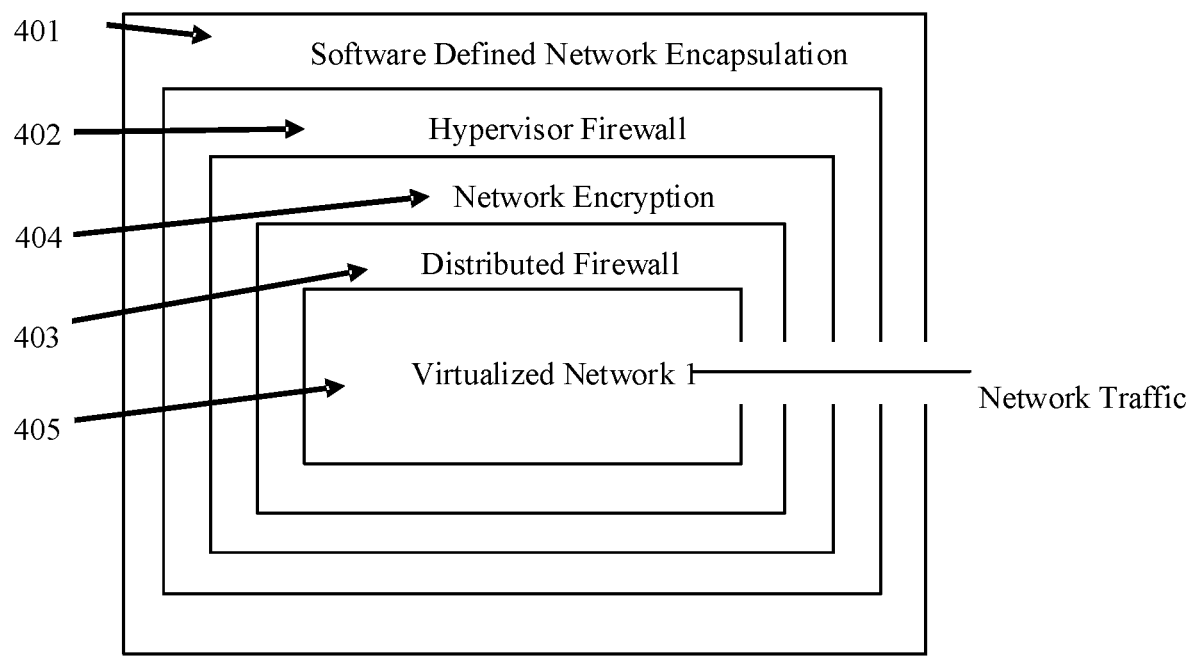
FIG. 4 illustrates an expanded horizontal view of virtual machine (VM) East/West traffic, according to an exemplary aspect of the present disclosure.

FIG. 4 shows an example VM East/West network traffic, according to aspects of the present disclosure. The diagram shows the East/West dedicated encrypted tunnel protection for traffic going between two application servers 104 disclosed in connection with FIG. 1. The disclosed computing platform 100 may be configured to provide multiple layers of protection to prevent network interaction between virtualized networks that are simultaneously operating. The following describes each layer:

Layer 1 401: SDN virtualized network encapsulation may provide the foundational separation of the virtualized networks traffic. A separate logical network may be created for each virtualized network. This process ensures that only VMs connected to same logical network may be permitted to communicate with each other. Specific headers and footers of each data packet in the network traffic may be inserted at Layer 1 (no redirection required) in a communication path between the vNIC and a corresponding VM to ensure that all traffic is fully inspected by a firewall before any traffic may be permitted to proceed to the vNIC. In other words, the disclosed computing platform 100 may increase the size of each data packet to allow for SDN.

Layer 2 402: A network encryption component may be configured to protect and encrypt the East/West network traffic. For example, VMs may only communicate with VMs on the same virtualized network. As will be described fully below, rules may be implemented to explicitly allow encrypted VM-to-VM traffic on the same virtualized network, and prevent all undefined traffic using a deny all rule.

Layer 3 403: Dedicated encrypted tunnels-specific protection may be configured to ensure that VM traffic may only flow between VMs in the same virtualized network including but not limited to providing rules based on VM-specific properties (e.g., name, security group, or OS) in addition to properties like Internet Protocol (IP) address or port number used in legacy firewalls. Example rules may include explicitly allowing encrypted VM-to-VM traffic on the same virtualized network, but preventing all undefined traffic using a deny-all rule.

Layer 4 404: Applications, services, and ports may be identified and allowed to communicate only with authorized systems.

Layer 5 405: Application or service traffic flows between virtualized networks 1 and 2.

Figure 5:
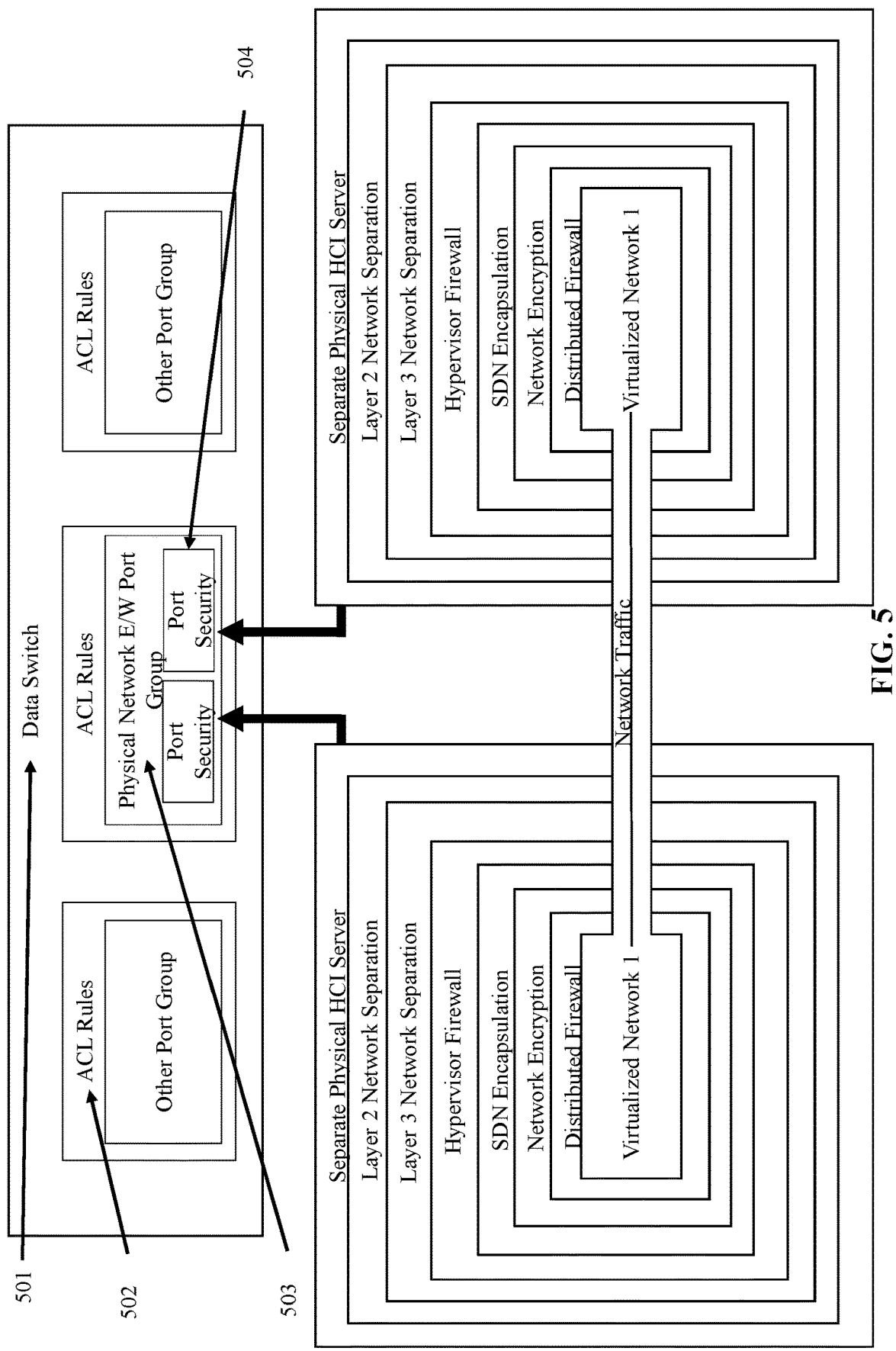
FIG. 5 illustrates additional physical protections for the East/West traffic across a switch, according to an exemplary aspect of the present disclosure.

FIG. 5 shows additional physical protections for the East/West traffic across an infrastructure switch which may be configured to isolate the traffic from other groups of ports and provide interconnectivity between internal components of computing platform 100.

A failure in any one of the five layers discussed in FIG. 4 may cause that layer to fail safe and prevent traffic from moving on the effected VMs or networks. Such layer failure may not have an adverse effect on the operation of the other four layers of security. However, traffic may not flow if it cannot traverse every layer completely. In one embodiment, SDN routing and software firewall may each drop a packet at the layer where a failure occurs, so network traffic cannot pass through. For example, the application server(s) 104 of FIG. 1 may be responsible for implementation of policy security controls and may be configured to report a monitored failure to the management server(s) 102 to disallow cross domain traffic.

Outside of virtualized networks-specific physical switches, computing platform 100 may be enclosed in one standard rack. In one embodiment, tamper tape may be placed over the bezel of the platform. An administrator may visibly see if a bezel has been removed from any of server 102, 104, or 106, exposing storage and other critical components to unauthorized access. A bezel is most simply defined as the outside frame around an object or device. In the case of data centers, a server bezel is a front cover or faceplate found on the front of a server. Further, easily identifiable labels for each piece of network cabling reduce the chance of human error that may result in a misconfiguration. USB ports on computing platform servers 102, 104, 106 have been disabled via, e.g., a remote access controller system. Administrators do not have permission to enable these ports. If someone attempts to re-enable or modify the USB ports, an error message may be generated, displayed and logged to the remote access controller system lifecycle controller log.

In accordance with aspects of the present disclosure, the integrity of the physical system of computing platform 100 may be protected by the following restrictions and conditions.

First, a secure booting system integrated with a unified extensible firmware interface (UEFI) may be configured to protect various management server(s) 102, application server(s) 104, and edge server 106. If any system alteration is detected at startup, the system "purple screens" and crashes. A change to the core virtualization software 102a, 104a, 106a operating system requires a reboot. Therefore, the system is protected against real-time changes. The secure boot function of the virtualization software 102a, 104a, 106a may perform an integrity check of the core hypervisor operating system, other drivers, and system files during boot-up. RBAC rights management tools may routinely scan the hypervisor configuration (e.g., virtualization software 102a, 104a, 106a in FIG. 1) to monitor and detect real-time alterations or configuration drifts in these hypervisor. Both subsystems report issues or configuration concerns to the audit tracking system. Further, TPM/TXT and RBAC management tools integration may ensure the hypervisor hardware platform has not changed since the last boot and provide alerts and notifications in the event of system changes. They also ensure that the configuration is compliant with cybersecurity best practices settings and prevent drift. In addition, in some embodiments, computing platform 100 may be configured to monitor the integrity of the file systems for the following system components (e.g., via advanced intrusion detection environment (AIDE) software or any other suitable software): SDN Manager, RBAC rights management tools, SDN Controllers, and SDN key manager.

Referring back to FIG. 1, in one embodiment, computing platform 100 may include two management servers 102, two application servers 104, an edge server 106, two physical network switches (not shown). All of these servers may include Intel Boot Guard, which extends the platform root of trust to the platform controller hub (PCH). In one aspect, the PCH may be configured to contain one-time-programmable fuses that are burned, along with the boot guard policy and the hash of the master public key, at the OEM hardware factory during the EMC manufacturing process. The key manifest on the BIOS SPI flash is signed by the master OEM key, and delegates authority to the boot policy manifest key. Then the boot policy manifest authorizes the initial boot block (IBB), which is the first BIOS code module to execute at reset vector. If the IBB fails authentication, boot guard may be configured to stop the hypervisors (e.g., virtualization software 102a, 104a, 106a in FIG. 1) and its corresponding servers from booting. Each BIOS module may be configured to contain a hash value of the next module in the chain and uses the hash value to validate the next module. The IBB validates (SEC+PEI) before handing off control to it. The (SEC+PEI) then validates (PEI+MRC), and (PEI+MRC) further validates the (DXE+BDS) modules. If enabled, the UEFI Secure Boot then extends the root of trust to the remaining BIOS, third-party UEFI drivers, and OS loader.

In one embodiment, each of the two management servers 102 may be configured to run virtualization software 102a and function to house the systems and applications needed to administer the roles and security mechanisms for computing platform 100. These out-of-band management servers 102 may be accessed remotely or from any virtualized networks 1-n. Out-of-band management may generally refer to a solution that provides a secure dedicated alternate access method into the disclosed computing platform management infrastructure to administer connected devices and management plane assets without having direct access to anything related to network and user data. For systems management of the disclosed computing platform, out-of-band management may involve the use of various management interfaces dedicated to a management plane of the computing platform for an administrator to leverage in order to make changes it updates to the system. Among other things, out-of-band management may allow a network operator to establish trust boundaries in accessing various management related interfaces on the system. Further, the management plane of the present application generally provides a single application programming interface (API) entry point to the system, persists user configuration, handles user queries, and performs operational tasks on all management, control, and data plane nodes in the system. Dedicated physical and virtual networking infrastructure made available only to the administration of the platform. Administrators of the disclosed computing platform interface with all management tools via this medium. No direct data path may exist between management networks and virtual networks provided to the hosted enclaves.

Application servers 104 in a cluster may be configured to run virtualization software 104a. This cluster may be used to provision the network, compute, and provide storage associated with each active and standby virtualized networks 1-n.

Edge server(s) 106 may be configured to provide the only physical external connectivity for computing platform 100. Server 106 may be the virtual to physical demarcation point for virtualized networks traffic as it traverses outside computing platform 100 approval boundary and the virtualized networks LAN (including physical switches, workstations, and WAN transport connections). Dedicated NICs (e.g., two NICs) per virtualized network may be implemented to ensure physical separation and resiliency as network traffic traverses outside the network's boundary.

Figure 6:
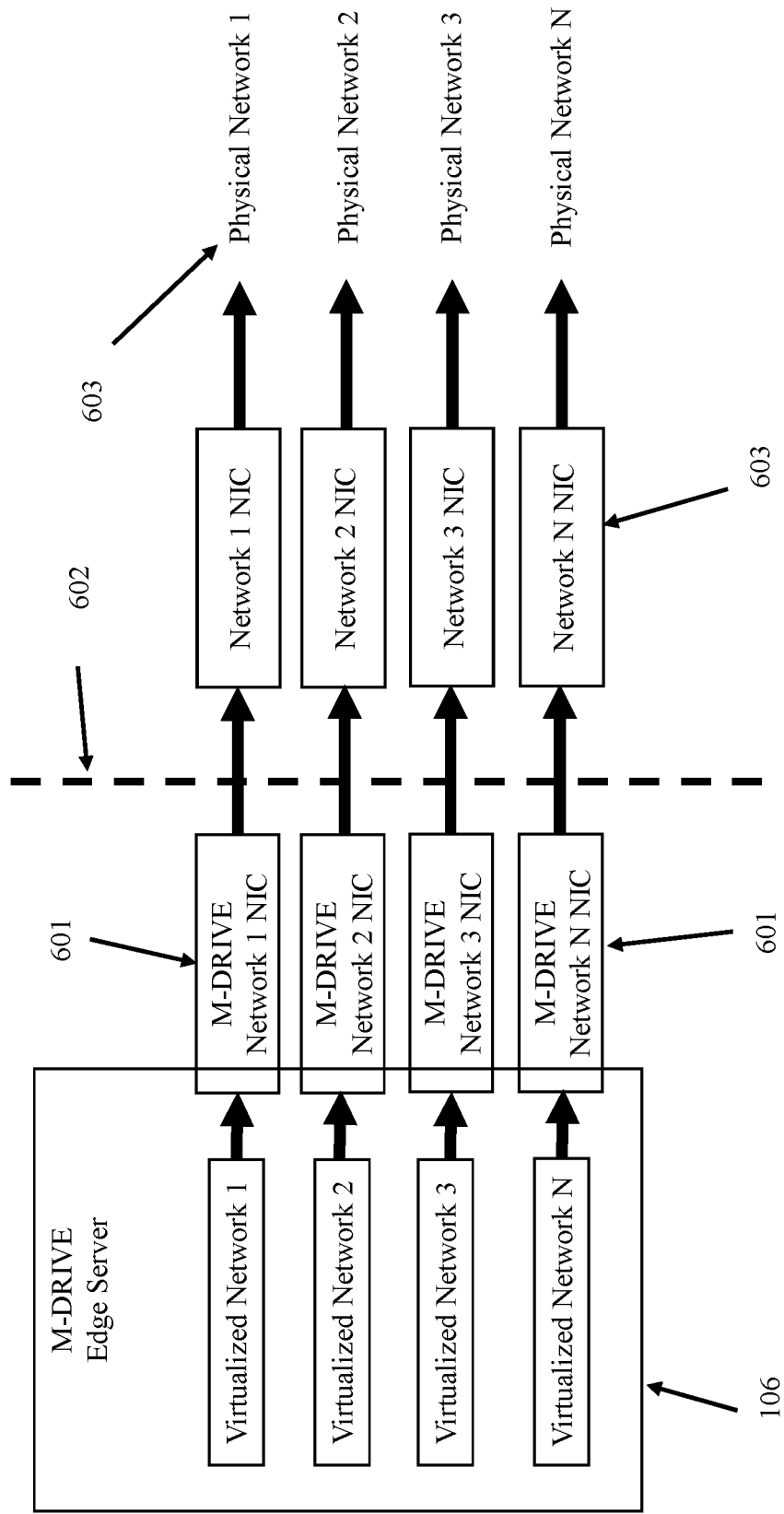
FIG. 6 illustrates a representative model of the Edge server's external connections and the external networks, according to an exemplary aspect of the present disclosure.

Referring to FIG. 6, a representative model of an edge server's external connections and external networks is illustrated, according to aspects of the present disclosure. In one embodiment, edge server 106 may be configured with a selected number of NICs 601 (e.g., 14 NICs) to provide redundant networking support for up to four active networks. NICs 601 may be the only physical external connections to the system reside at the edge server 106, which enforces the computing platform 100 pre-provisioned policies to establish network traffic flow. 602 indicates a definitive boundary to the platform 100 policy controls. All resources existing beyond this demark point 602 may be controlled and configured by that network enclave's administrators. 603 may illustrate the physical infrastructure dedicated to the enclave users, which may include network transport capabilities. Therefore, 603 and beyond may be agnostic hardware in a network environment and does not adversely affect the security controls of the security boundary of the computing platform 100.

In one embodiment, computing platform 100 may include two physical network switches, one for management and storage traffic and the other strictly for network data traffic. Using two separate switches may ensure that network data traffic is isolated from management and storage traffic. Both switches may be configured to have enhanced security in accordance with relevant regulation, guidelines, and security best practices. In one embodiment, the following virtual local area networks (VLANs) may reside on the physical network management switch: hypervisor management, OBM VM, OBM host vMotion, application host vMotion, management, storage area network (SAN) 0, storage area network (SAN) 1. The VLAN for network data may reside on the physical network data switch. These switches may be divided into smaller zones of traffic using ACLs and port security.

Administrative access to the data and management physical switches may be restricted to a computing device (e.g., a laptop), and it is further protected by requiring a user name and password. Password settings conform to strict standards with a minimum length of 15 characters, which must include: at least two uppercase and two lowercase characters, two numbers, and two special characters. The physical switches may be configured to support administrative access via the front serial console port, a rear OOB Ethernet port, and an in-band connection. Both the rear port and in-band connection may be disabled to restrict access to the serial console port.

Port security may refer to the ability to limit the mandatory access control (MAC) addresses allowed to source packets on a physical interface. The physical switches may be configured to obtain necessary MAC addresses and record them to a configuration file, such that only the recorded addresses may pass traffic on specific switch interfaces. If an unknown MAC appears on an interface, the physical switches may be configured to shut down the interface and generate a message detailing the violation. An administrator must physically access the physical switches, log onto the console port, and specifically enable the downed port for traffic to pass again.

In one embodiment, ACLs may be configured to operate at Layer 3 shown in FIG. 5 and only allow for traffic that facilitates host traffic within the system. Violations of these ACLs may be logged in the form of Syslog messages and forwarded to auditing and tracking tools.

The physical switches may have at least one USB port on a rear end of the unit that provides a simple method of moving configuration files to and from the switch. The USB port may not provide access to the switch. The USB must be mounted before a connected device can be used, and this requires administrative access to the switch. The USB port may be disabled as part of the baseline configuration and can only be activated by an authorized administrator who is locally logged onto the switch.

In accordance with aspects of the present disclosure, computing platform 100 may include a number of software subsystems: hypervisor, management server appliance, RBAC rights management tools, SDN, AD, auditing and tracking tools, HCI Software, integrated remote access controller (iDRAC), infrastructure switch, and virtualized networks VMs. Each of these software subsystems will be described fully below.

A type 1 hypervisor may include and integrate vital OS components, such as a kernel. By consolidating multiple servers onto fewer physical devices, hypervisor reduces SWaP and IT administrative requirements while driving high-speed performance. Computing platform 100 may use one or more hypervisors, such that multiple virtualized networks 1-n may be executed on the same hardware. The hardware platform of computing platform 100 may be virtualized and network VMs may be maintained separately while achieving performance and security requirements. That is, a hypervisor may be configured to create and run VMs and virtual appliances. The hypervisor may use virtualization to transform individual virtualized networks into aggregated computing infrastructures that include CPU, storage, and networking resources. Hypervisor may manage these infrastructures as a unified operating environment. The hypervisor provides the virtual security architecture for various hypervisor servers (management, application, and edge servers 102, 104, 106 of FIG. 1), including but not limited to: VM isolation, native network isolation of the hypervisor kernel, virtual networking layer, management interface firewall, lockdown mode, VM encryption, and secure boot. VM isolation is described in the following table:

| Element | Description |
| --- | --- |
| Virtualization extensions | These technologies automatically trap sensitive events and instructions, eliminating the software overhead of monitoring all supervisory-level code for sensitive instructions. In this way, VT-x and AMD-V give the Virtual Machine Manager (VMM) the option of using either hardware-assisted virtualization or binary translation, depending on the workload. |
| Instruction isolation | Intel VT-x and AMD-V extensions don't enable VMs to run at protection Ring 0. Only the VMM runs at a hardware privilege level; guest operating systems run at a virtualized privilege level. |
| Memory isolation | The Hypervisor software allocates memory when it defines the resources to be used by the VM. A guest OS uses physical memory allocated to it by the Hypervisor software and defined in the VM's configuration file. |
| Memory Protection | To protect privileged components, such as VMM and hypervisor software Hypervisor software, the hypervisor uses address space layout randomization (ASLR). It randomizes where core kernel modules are loaded into memory. The NX/XD CPU features enable the hypervisor software to mark writeable areas of memory as non-executable. Both methods protect the system from buffer overflow attacks in the running code. |

-continued

| Element | Description |
| --- | --- |
| Device Isolation | Each VM is isolated from other VMs running on the same hardware. VM share physical resources such as CPU, memory, and I/I devices; but a guest OS in an individual VM cannot detect any device other than the virtual devices made available to it. |

Just as a physical machine can communicate with other machines in a network only through a network adapter, a VM may communicate with other VMs running on the same or a different hypervisor host only through a virtual switch. Further, a VM communicates with the physical network, including VMs on other hypervisor hosts, only through a physical network adapter. The virtual networking layer may include virtual network devices through which VMs interface with the rest of the network. The hypervisor may rely on the virtual networking layer to support communication between VMs and their users. In regards to VM isolation in a network context, the following rules may be applied: i) If a VM does not share a virtual switch with any other VM, it may be completely isolated from other virtual networks within a server; ii) If no physical network adapter is configured for a VM, the VM may be completely isolated from any physical or logical networks.

Using a vNIC level firewall, a VM may be isolated from other VMs, even on the same switch (Layer 2 isolation). These rules may be applied to the vNIC of the VM, not at the switch, enabling them to travel with the VM.

Further, the virtual networking layer may include various virtual network devices used by VMs to interface with the rest of the network. The hypervisor relies on this layer for communication between VMs and their users, and the hypervisor hosts use it to communicate with iSCSI storage area networks (SANs) and network-attached storage (NAS).

Computing platform 100 may use virtual switches in the following areas: hypervisor distributed switch for VMs on management servers and for the hypervisor management; SDN hypervisor distributed switch on the application servers; and standard virtual switch or distributed virtual switch on edge server(s) 106.

Each virtual switch may be configured to provide local network connectivity for the local VMs on the local host(s). For instance, the management VMs remain isolated to local traffic on the backend infrastructure.

According to aspects of the present disclosure, a management interface firewall built into the hypervisor may be configured to restrict network addresses that can connect to the management interface. With communication to the hypervisor host over the management interface restricted by transmission control protocol (TCP) port number, functionality other than administration is enabled, including hypervisor vMotion and high availability, hypervisor fault tolerance, IP-based storage, and other basic functions such as domain name system (DNS), logging, and network time protocol (NTP). This management interface firewall may be enabled and configured on computing platform 100 to provide defense-in-depth on the management plane.

Moreover, a lockdown mode is a feature of hypervisor that disables log-on and API functions from being executed directly on a hypervisor server. It is available only on hypervisor servers that have been added to management server 102. When a server is in the lockdown mode, users cannot run hypervisor command line interface (CLI) commands from an administration server or from a script. Use of lockdown mode may remove all hypervisor API privileges associated with root. In a lockdown mode, only the service account has authentication permissions. No other users can perform operations against the server directly. The root account cannot be logged onto and API operations cannot be run using it, making it a key component of computing platform 100 isolation.

The hypervisor VM encryption component may be configured to ensure data is kept secure. When computing platform 100's VMs read/write to the platform storage system, data may be encrypted in motion (across the storage backplane) and at rest (on the disks). Data coming from a VM is encrypted before it stored in the VM disk (VMDK).

In one embodiment of the present disclosure, if VMDK data is accessed by any unauthorized entity, only meaningless data may be shown. The VM that legitimately owns the VMDK has the necessary key to decrypt the data whenever that data is read and then fed to the guest OS using industry-standard encryption algorithms to secure this traffic with minimal overhead. In one embodiment, computing platform 100 may use processors that support the Intel Advanced Encryption Standard—New Instructions (AES-NI) set to speed up the encryption/decryption operations. Only privileged users that are assigned the cryptographic operations can perform those functions. The privilege set may be fine-grained, and the default platform administrator role may include these privileges. The community of interest (COI) administrator role cannot change cryptographic operations.

Figure 7:
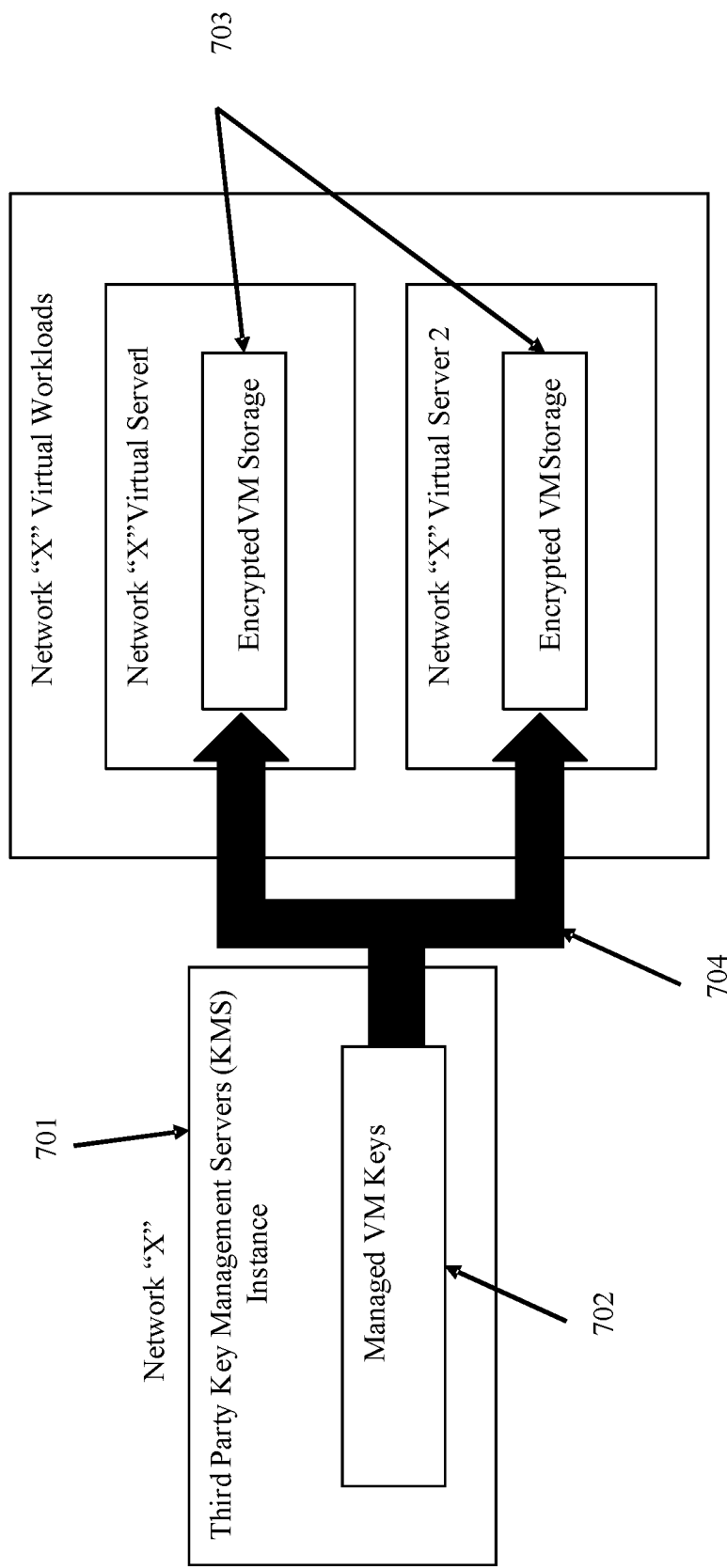
FIG. 7 illustrates an overview of hypervisor VM encryption, according to an exemplary aspect of the present disclosure.

FIG. 7 shows an overview of VM encryption, in accordance with aspects of the present disclosure. In one embodiment, VM encryption components may include an external KMS 701, management server 102, and hypervisor servers. The management server 102 may be configured to requests key from the external KMS 701, which may be configured to generate and store the keys and pass them to management server 102 for distribution. The managed VM maintains all KMS keys 702 for distribution to any KMS client. Virtual servers may be encrypted with these keys, and for more security, the encryption may utilize not only the encryption key, but also a block's address. This means two identical data blocks of a VM disk 703 with the same content may result in different encryption values. To prevent a compromise of the encryption keys and the encrypted data, each component may be hosted from different hypervisor servers. All KMS systems and policies may be a preconfigured feature of the computing platform, and the keys and encrypted VM may be on separate virtual management servers by pre-provisioned computing platform 100 policy. All encryption policy application happens via trusted connection 704 over KMP for key management.

VM encryption may support the encryption of VM files, virtual disk files, and core dump files. Log files, VM configuration files, and virtual disk descriptor files may not be encrypted because they contain non-sensitive data and may be used in disk management. VM encryption uses hypervisor APIs for I/O filtering, which allows VM data to be intercepted in the virtual small computer systems interface (vSCSI) emulation layer.

The vSCSI layer may include a layer in hypervisor that resides between the VM and the VM file system (VMFS). The I/O filter framework, which is used to implement services like encryption, caching, and replication, may be implemented entirely in user space. This may allow the VM data to be isolated from the core architecture of hypervisor, eliminating potential issues to the core functionality of the hypervisor. In the event of a failure, only the VM in question may be affected.

Figure 8:
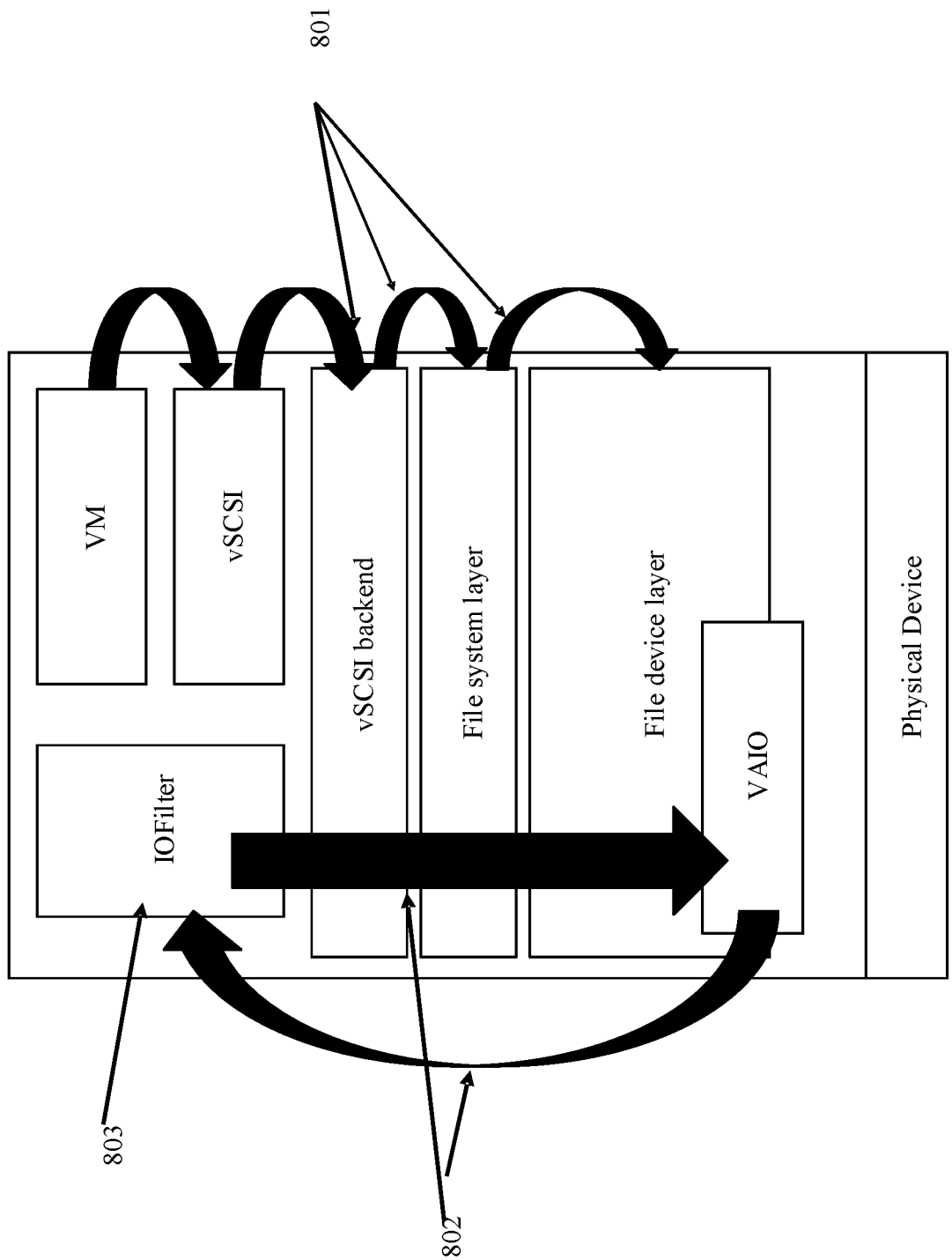
FIG. 8 illustrates various filters of a VM layer, according to an exemplary aspect of the present disclosure.

In accordance with aspects of the present disclosure, application servers and data hosts may access their underlying storage systems, as shown in FIG. 8, and there may be multiple filters enabled for a VM or a VMDK, and these filters may be sequentially chained 801. Data may be processed serially by each of these filters, then passed to VMFS if not stopped by a filter. Industry standard protocols 802 may be leveraged to access storage and the VM may have its I/O safely and securely filtered in accordance with a policy when applied, such that data may be exchanged between IOFilter and vSphere APIs for I/O filtering (VAIO). HCI virtual controllers may gain secure access to storage devices to be made available as a collection of disks spread across multiple storage nodes. Each VM may be provided direct communication channel 803 to underlying storage subsystem. These protocols are leveraged specifically by the hypervisor to ensure all storage related data may be subject to policies enforced to the hypervisor via the IOFilter and includes VM specific disk storage processes.

Figure 9:
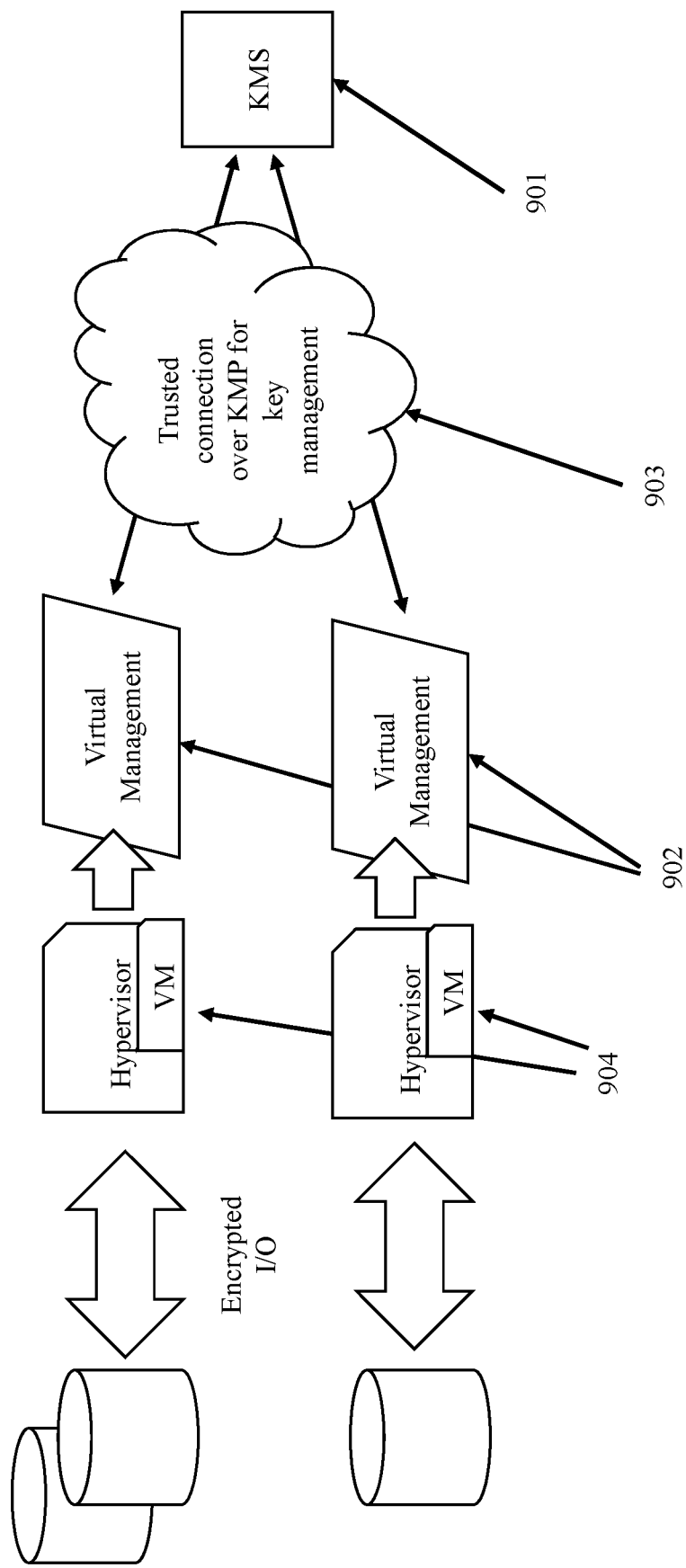
FIG. 9 illustrates a simplified topology of an external key management system (KMS), according to an exemplary aspect of the present disclosure.

FIG. 9 shows a simplified topology of the KMS. In one embodiment, KMS 901 may be a secure, centralized repository of cryptographic keys for computing platform 100. Due to redundancy, computing platform 100 may have more than one KMS configured with a management. One of the KMS 901 may be designated as the default in management. For example, KMIP v1.1 compliant KMSs may be supported, and management server 102 of FIG. 1 may be the client of KMS. KMIP may enable management server 102 to communicate with any KMIP-compliant KMS vendor as part of virtual management 902. Trusted network connection 903 may be configured to facilitate the connectivity between the KMIP services running on the Hypervisor 904 and the KMS Server Virtual Management 902.

Two types of keys may be used for VM encryption:

i) Data Encryption Key (DEK): the application server 104 and its hypervisor may be configured to generate and use internal keys to encrypt VMs and disks; and ii) Key Encryption Key (KEK): The management server instance requests AES-256 keys from the KMS. The management server 102 may store the ID of each KEK, but not the key itself.

Initially, the hypervisor hosts may not have the necessary keys to perform cryptographic operations like encrypting and decrypting guest data. The management server 102 may obtain the keys from the KMS and forward them to the hosts using the KEKs. The host generates the DEKs, which are then used for encrypting and decrypting VM files.

KEKs may be used to encrypt the DEKs, and these encrypted DEKs are stored in configuration files. Once encrypted, the KEK for the VM needs to be in Hypervisor memory for the VM to be powered on. If for some reason the Hypervisor host is power cycled or the encrypted VM is unregistered and then re-registered, management server 102 may be configured to obtain the KEK from KMS again and push it to Hypervisor. KEKs may be stored only in the KMS where they are generated and not persisted anywhere on hypervisor. KMS should be highly available, or keys should be replicated between multiple KMS instances added to the same KMS cluster for accessibility of KEKs.

During the encryption process, different hypervisor components interact as follows:

a). When the maintenance administrator performs an encryption task, such as creating an encrypted VM to support a new virtualized network on computing platform 100, management server 102 may be configured to request a new key from the default KMS. This key is used as the KEK.

b). Management server 102 may be configured to store the key ID and pass the key to the Hypervisor host. If the Hypervisor host is part of a cluster, management server 102 may be configured to send the KEK to each host in the cluster. The key itself is not stored on the management server system 102. Only the key ID is known.

c). The hypervisor host generates DEKs for the VM and its disks. It keeps the internal keys in memory only and uses the KEKs to encrypt internal keys. Unencrypted internal keys are never stored on disk. Only encrypted data is stored. Because the KEKs come from the KMS, the host continues to use the same KEKs.

d). The hypervisor host encrypts the VM with the encrypted internal key. Any hosts that have the KEK and can access the encrypted key file can perform operations on the encrypted VM or disk.

In one embodiment, computing platform 100 may be configured to use hypervisor UEFI secure boot to verify the integrity of the hypervisor hosts at startup.

The Hypervisor servers may include the following components, each of which is cryptographically signed:

| UEFI Component | Description |
| --- | --- |
| Boot Loader | The Hypervisor boot loader is signed with the Microsoft UEFI Public Certificate Authority (CA). This ensures that standard UEFI secure boot firmware can validate the boot loader. The boot loader code also contains a public key, which is used to validate the VM kernel. |
| Secure boot verifier | The secure boot verifier validates every cryptographically via at least one public key. |
| Installation Bundle (VIB) | A VIB is a file archive (TAR g-zipped file), an XML descriptor file, and a digital signature file. When Hypervisor boots, it creates a file system in memory that maps to the contents of the VIBs. If the file never leaves the cryptographically signed archive, then you don't have to sign every file, just the archive. The VIBs are signed with the public key and validated with the secure boot verifier. |

Figure 10:
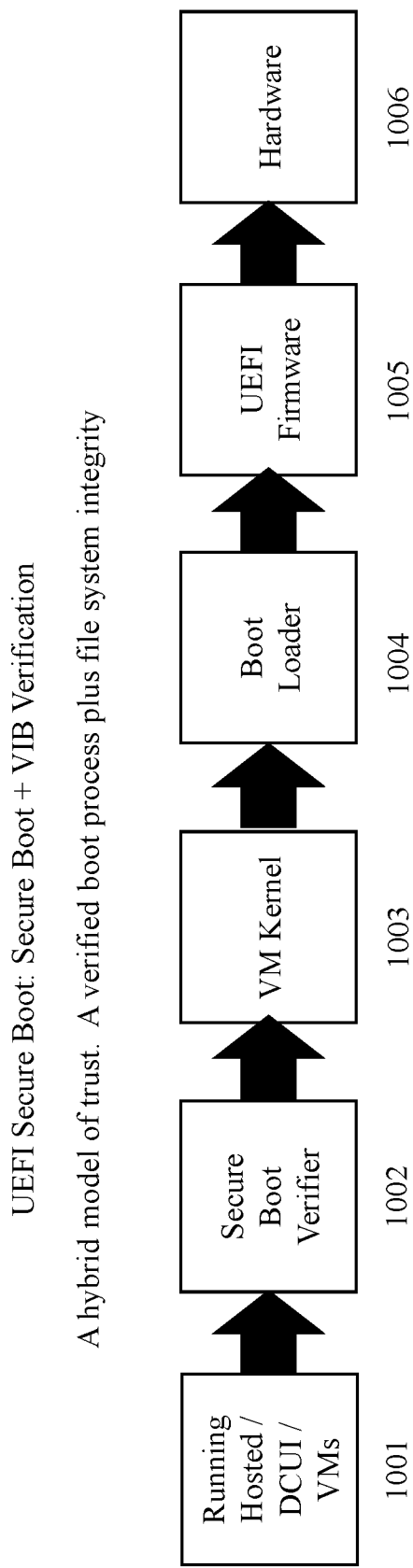
FIG. 10 illustrates a high-level overview of unified extensible firmware interface (UEFI) secure boot VIB certification process, according to an exemplary aspect of the present disclosure.

An example secure boot process may be the following: host powers on, UEFI validates the hypervisor boot loader against a digital certificate, hypervisor boot loader validates the kernel against the digital certificate, kernel runs the secure boot verifier, secure boot verifier validates each VIB against the digital certificate, hypervisor server boots up. FIG. 10 shows a high-level overview of the UEFI secure boot VIB certification process.

| Reference | Process Step | Process Description |
| --- | --- | --- |
| 1001 | Running hosted/DCUI/ VM's | Secure Boot Verifier validates all VIB's against digital certificate |
| 1002 | Secure Boot Verifier | VM Kernel starts Secure Boot Verifier which also contains digital cert |
| 1003 | VM Kernel | Boot Loader validates VM Kernel against digital certificate |
| 1004 | Boot Loader | Boot Loader contains digital certificate |
| 1005 | UEFI Firmware | UEFI firmware validates Boot Loader against that digital certificate |
| 1006 | Hardware | Vendor supplied UEFI firmware contains digital certificate |

2. The virtual management server may include a pre-configured Linux VM, which is optimized for running management server 102 and the associated services on Linux. The virtual management server may be configured to enable the management of Hypervisor hosts. Each hypervisor server may be set in a lockdown mode, forcing administration through the virtual management server console. RBAC management tools may provide an administrative proxy to the administrative processes.

On computing platform 100, virtual management server may be used to manage a network's multiple hosts and pool resources. Installed on a management server 102, virtual management server may centralize the operations, resource provisioning, and performance evaluation of VMs residing on computing platform 100. It provides a central management console to manage all the system's VMs.

In accordance with aspects of the present disclosure, the virtual management server may be configured to provide statistical information about the resource use of each VM and adjusts compute, memory, storage, and other resources from a central application. It may manage the performance of each VM against specified benchmarks, and optimize resources wherever required to provide consistent efficiency throughout the networked virtual architecture. Besides routine management, this virtual center may be configured to ensure security by defining and monitoring access control (AC) to and from the VMs, migration of live machines, and interoperability and integration among other Web services and virtual environments.

On computing platform 100, virtual management server administration may be controlled using defense-in-depth with RBAC management tools as a proxied instance.

3. RBAC management tools is a virtual appliance that resides between administrators and the hypervisor to add critical role-based access controls, visibility, and secure multi-tenancy to the virtual infrastructure. RBAC management tools is a proxy, separating operator duties and monitoring access to ensure that only authorized personnel configure security controls and policies. Users are unaware that they are going through this proxy.

On computing platform 100, RBAC management tools may be configured to limit and control the functions of the hypervisor environment. This may enable a second level of control for objects within the hypervisor platform and prevent accidental or intentional attempts at misconfiguration of the platform. Furthermore, RBAC management tools roles and permissions limit users to routine operational functions. With its expanded logging capability, it records and tracks potential misconfiguration attempts.

In one embodiment, RBAC management tools may be configured to determine specifically what a user is allowed to do after logging onto the disclosed computing platform. RBAC management tools may be configured to authenticate, control, and apply additional RBAC controls to hypervisor functions during normal operation of the platform. RBAC management tools may also be configured to provide additional safeguards to prevent accidental or malicious configuration changes by the administrator. In one aspect, RBAC management tools may include a virtual appliance deployed as a transparent proxy that allows for a single-entry point and non-intrusive application of security controls to all administrator actions within the hypervisor environment. Fundamentally, any action that is issued by an administrator is proxied, evaluated, logged, and forwarded to the virtual management server (if approved).

Figure 11:
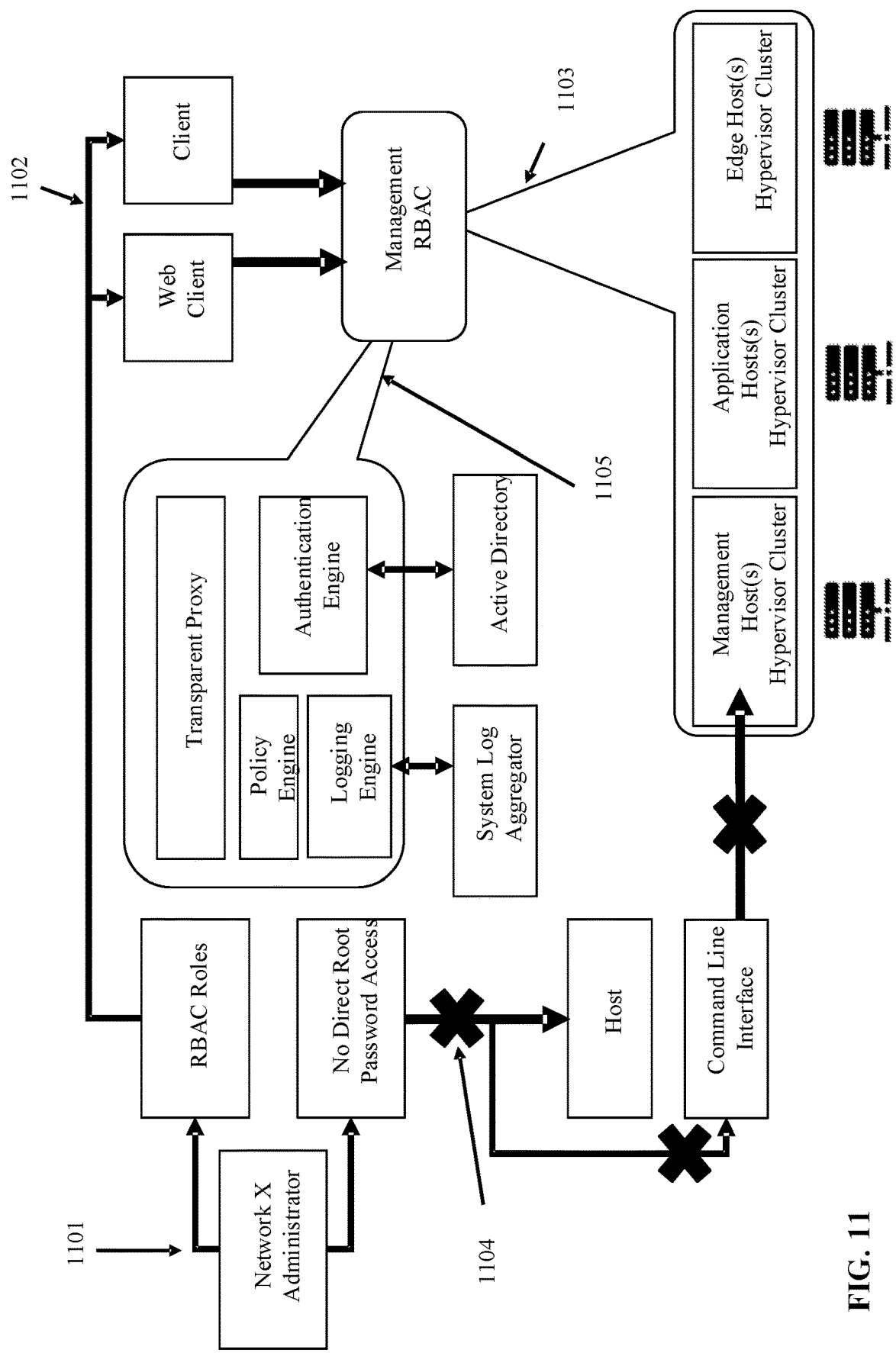
FIG. 11 illustrates an architecture of role based access control (RBAC) rights management tools, according to an exemplary aspect of the present disclosure.

RBAC management tools may be implemented within the hypervisor management network and only interacts with administrator actions, so there is no impact on VM performance or network traffic. The RBAC management tools solution may provide many capabilities, including granular RBAC, object-based access controls, secondary approval, audit quality logging, hypervisor configuration hardening, and trust attestation service. These capabilities may allow computing platform 100 to secure the contents of each virtualized network 1-*n* at the virtualization layer. An example RBAC management tools architecture is illustrated in FIG. 11. Referring to 1101, the specific network enclave administrator may assign pre-defined RBAC roles available to the computing platform 100 that are accessed via web or direct client 1102. The RBAC management policies may be pre-defined and automatically applied to each capability of computing platform 100, the management; application; and edge 1103 components. Security controls may be pre-provisioned by policy to ensure no direct access 1104 outside of enclave network administrator RBAC capabilities are authorized which maintains the integrity of the RBAC and enforces the pre-approved policies 1105 for logging and authentication that are specific and independent to each individual network on the computing platform 100.

In one aspect, RBAC management tools transparent proxy may act as a central point of control by intercepting, monitoring, enforcing, and logging all administrator requests originating from the hypervisor Web Client and the hypervisor HTML5 Web Client (hypervisor Client and SSH are disabled on this system). The RBAC management tools proxy appliance may be deployed in active-passive pairs, so that if the primary (active) appliance fails, the secondary (passive) appliance takes over the network identity and serves as the primary RBAC management tools appliance.

Furthermore, RBAC management tools policy engine may add another enforcement mechanism that enables computing platform 100 to implement security best practices such as "separation of duties" policies that keep privileged users in their swim lanes or the implementation of the "principal of least privilege" within a given role, thereby enforcing the mechanism of the dedicated encrypted tunnel.

In one embodiment, the RBAC management tools policy engine may be configured to allow computing platform 100 to limit privileged user access to objects with or without a certain label (such as Alpha domain or Bravo domain). A Bravo network administrator, for example, cannot administer, access, or even view Hypervisor resources from any other domain except Bravo. VMs and other resources are tagged. When the administrator logs on, only objects tagged "BRAVO virtualized networks VM" may be visible.

Additionally, RBAC management tools may constrain a user to access only "BRAVO virtualized networks VM" objects when coming from the known IP range/subnet. This functionality allows computing platform 100 to logically segment each virtualized networks VM by the logical boundaries that define it. Access to the RBAC management tools console is limited to a management laptop.

Next, RBAC management tools may be configured to enforce access rights and security compliance to align with the system/security requirements of each administrator role. The RBAC functionality may be integrated into the system to provide granular control of security policies, restricting administrative rights to specific roles and work functions (or tasks).

In one aspect, the RBAC capabilities may be integrated with virtual resources through the virtual management server management system to include VMs, port groups, virtual switches and Hypervisor hosts. These RBAC capabilities may be configured within the management domain AD with the appropriate users tied to one or more groups designated on the system to enforce policy and controls. The end result of this is that the dedicated encrypted tunnels will be able to keep virtualized networks user access separated and only permit validated admin roles to access the enclave that they are administering.

In one embodiment, RBAC management tools may include five elements: objects, groups, roles, labels, and rules. In one embodiment, the objects may include the VMs and virtual networks; the groups may refer to the collection of users that have access to the resources; the roles may include policy that restrict/allow access to specific areas of the system; the labels may include the tagging of the objects; and the rules may include the policy mechanisms enforced from the disclosed security architecture.

Further, the RBAC management tools authentication engine may be configured to provide an extra layer of security, along with the usual user name and password. RBAC management tools validates privileged user access requests made through the RBAC management tools transparent proxy using AD to verify proper group membership. RBAC management tools also ensures that users accessing the disclosed computing platform are properly authenticated.

In another aspect, RBAC management tools compliance engine may be configured to assess the system against the Hypervisor and VM container STIGs to assess compliance on a recurring basis. RBAC management tools may provide "out of the box" compliance templates for common control baselines, and these templates may be customized with organizational specific controls. For example, RBAC management tools may verify that Syslog events are sent to a security information and event management platform, ensure NTP settings are correct, check time out settings, and allow only VIBs with the proper acceptance level. If the system is non-compliant with any of the STIG settings, the compliance engine automatically reapplies the settings to bring the system into compliance.

In one embodiment, a RBAC management tools dashboard may display the current and trending levels of compliance with STIGs and the number of hosts that are in or out of compliance. RBAC management tools also provides scheduled reports that show compliance drift over time and a detailed log of all transactions performed against the virtual environment.

In another embodiment, RBAC management tools may authenticate administrators through Windows AD. At each login, an administrator may be authenticated against her AD credentials. RBAC management tools may use a Service Account to query AD for authentication. RBAC management tools intercepts all requests destined for RBAC management tools-protected hosts, such as Hypervisor and the virtual management server, and authenticates the user against the Directory Service. Authentication of the user (including session ID) lasts for the full RBAC management tools session. Once a session is established, authorization to perform an operation (including verification of directory group membership) can occur multiple times in a session. After RBAC management tools authenticates the administrator, it performs an authorization check for each request based on the local policy data. If authorized, RBAC management tools may be configured to forward the request (using a special service account) to a target server.

The following may be the authentication and authorization process using a hypervisor client which may include software on an end user device an administrator would use to access the entire system or administer one or more networks. One may not use the hypervisor client to access any enclave data.

A). RBAC management tools obtains the administrator's identity during log on.

B). RBAC management tools queries AD to authenticate the administrator and validate the password. RBAC Management Tools also obtains group membership information to authorize attempted operations, such as the following:

a. Identify the requested operation (such as start a VM).

b. Identify the object admin is targeting for an operation (such as VM 'mref 449').

c. Query the RBAC management tools policy database to identify the list of admin groups authorized to perform the requested operation on the specified object and determine if the current admin is a member of an authorized user group.

d. Log information about the operation, the admin, and the object involved.

If the user is authorized, RBAC management tools may re-issue the operation request and send it to the management server 102 or clustered hypervisor host where the original logon request was routed. Otherwise, RBAC management tools returns an error message to the user. If RBAC management tools cannot authenticate a user, then authentication fails, and the admin is denied access to the specified target.

4. RBAC rights management tools may be configured to enable computing platform 100 to manage all their encryption keys at scale, how often they rotate them, and how they are shared securely. For example, KMS may be configured to provide keys to encryption acting as an independent provider.

RBAC rights management tools may be a scalable KMIP server that serves as the KMS for VM encryption. RBAC rights management tools may provide key management services by automating the lifecycle of encryption keys and providing key storage, distribution, rotation, and key revocation.

Delivered as an open virtualization archive (OVA) file, RBAC management may be installed and connected to management as a KMS and configured in an active/active cluster scheme to ensure key availability to management. The methodology of the key process is as follows:

a). The Hypervisor host (managed by management server 102) generates and uses an internal key, called the data encryption key (DEK), to encrypt VMs and disks.

b). The management server 102 then requests a key from RBAC rights management tools. This key, known as the key encryption key (KEK), is then used to encrypt the DEK.

c). The encrypted DEK and KEK ID are stored in the disk image metadata.

d). When a VM boots up on an Hypervisor host, or when the HCI data store is brought online, the Hypervisor host reads the KEK ID and requests the KEK corresponding to the KEK ID from management.

e). Management server 102 issues a request to RBAC rights management tools for the KEK corresponding to the KEK ID and delivers the KEK to the Hypervisor host.

f). The Hypervisor host uses the KEK to decrypt the DEK, and then uses the DEK for encryption and decryption.

5. Network virtualization platform, SDN, creates network services like routing, software firewalls, and other services that are software-based and implemented on the hardware platform. Computing platform 100 itself may be portable to other hardware platforms.

6. AD is a directory service that provides identity-related services. AD Domain Services (AD DS) may authenticate and authorize all users and computers in a Windows domain type network—assigning and enforcing security policies for all computers. Moreover, it may allow management and storage of information, provide authentication and authorization mechanisms, and establish a framework to deploy other related services.

In computing platform 100, AD may be installed in the management environment to enable RBAC. AD may provide an authentication mechanism for the administrator when using the RBAC management tools and hypervisor subsystems, and auditing and tracking tools. For example, each Windows server may use a pre-configured secure instance of Windows Server 2016 as the base OS. In one embodiment, the management domain AD instance may be based on the secured Windows 2016 baseline. At deployment, it may be scanned and configured to be compliant with the latest baseline STIGS, which do not have non-administrative users and does not authenticate any user-based traffic. The primary function of the AD instance may include authenticating three subsystems: RBAC management tools and its extension into hypervisor, and administrative access to the auditing and tracking tools system.

7. The HCI Software provides performance, scale, efficiency, and resiliency with policy-based intelligence and automation, as well as stability and security. By leveraging DirectPath (hypervisor PCIe Passthrough), HCI software bypasses the hypervisor for any storage-related input/output (I/O) activities.

In computing platform 100, the HCI software OS may be used to create HCI storage systems across the platform application and management servers that are pre-allocated between the management environment and each of the provisioned virtualized networks 1-*n*.

HCI software may allow the storage of each physical server in the system to be grouped into a single server that can be used by different VMs. Using HCI Software, computing platform 100 may be equipped with the HCI, which includes virtualized computing (a hypervisor), virtualized SAN (software-defined storage) and virtualized networking (software-defined networking).

In one aspect, HCI Software with HCI may combine a hypervisor virtualization technology with a linear-scaling all-flash storage array. Non-volatile memory express (NVMe) data paths and storage tiers with policy-based quality of service (QoS) may enable the consolidation of multiple, mixed application workloads. Available in an all-flash configuration, HCI Software leverages NVMe PCIe flash RAM and solid state drives to automatically enhance workload performance.

Moreover, HCI software nodes may be clustered and each node's capacity, input/output operations per second (IOPS), bandwidth, and cache are aggregated and available to any VM in the cluster. HCI software may be configured to use inline erasure coding to write and protect data. This erasure coding may be efficient when writing data, and also scrambles data for increased security. Data may be partitioned into small blocks and scattered across all the disks. Without the key and a multitude of server appliances, it may be virtually impossible to recompose the data. This is one way that the dedicated encrypted tunnels keep user data secure.

In one embodiment, the HCI software hardware may be operated from a VM running a heavily customized, Linux-based controller called the HCI software OS. HCI software may maintain direct access to the underlying storage, bypassing a virtualization layer, and provide a storage cluster available to VMs running on any HCI software system (node) within a cluster. Each node may contain a hypervisor on which the VMs execute. HCI software may be used to present storage to the hypervisor as an Internet small computer systems interface (iSCSI) target, simplifying the administration of connecting storage to VMs and eliminating the need to use complicated logical unit numbers (LUNs) masking to access storage.

Figure 12:
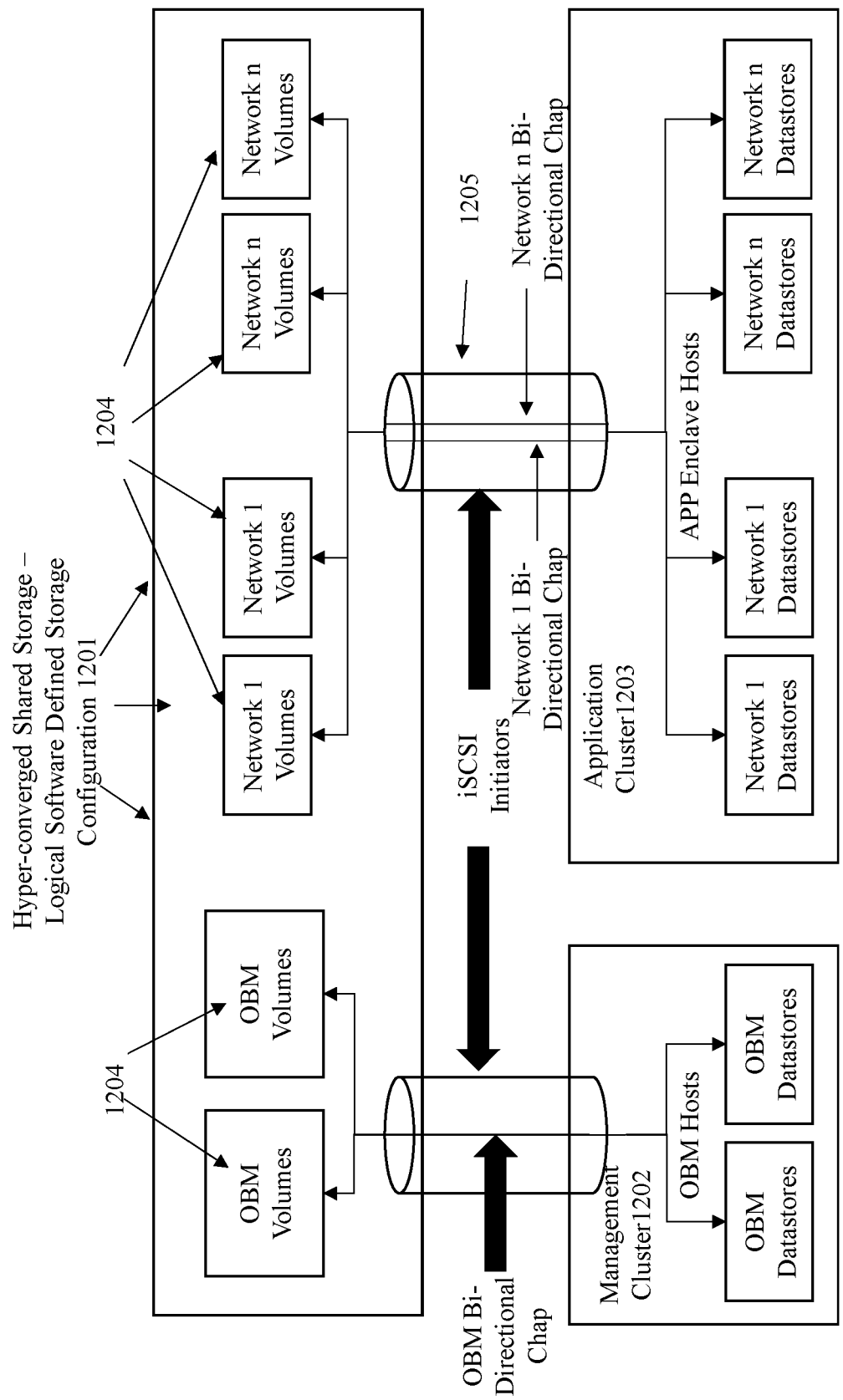
FIG. 12 illustrates an example of hyper-converged infrastructure (HCI) storage, according to an exemplary aspect of the present disclosure.

Further, bi-directional challenge handshake authentication protocol (CHAP) may be used to authenticate iSCSI connections to the HCI software volumes, where the management and virtualized networks data stores reside. Host access groups may be created in HCI software and are tied to iSCSI initiators of the Hypervisor hosts. For example, a separate host access group may be created for management and each virtualized networks volume. Each host access group may have different a bidirectional secret, which separates the enclaves and management domain and ensures that they may only access their assigned storage, as shown in FIG. 12. The Hyper-converged Shared Storage—Logical Software Defined Storage configuration 1201 may be configured to leverage the physical disk drives installed on each hardware server system to operate as one large storage device that stores all VMs for the solution. The storage system 1204 may be partitioned into storage pools dedicated to management and application contexts, respectively.

Security policies may be applied to ensure data separation is maintained 1205. Separate management cluster 1202 may be a group of physical servers that are dedicated to the Administration Management Plane of the system. These servers provide all the necessary CPU, memory, and networking components needed to run all the security software. Separate application cluster 1203 may be a group of physical servers that are dedicated to the Enclave logical networking resources of the system on the Data Plane. These servers may be configured to provide all the necessary CPU, memory, and networking components needed to run the various, logically separated, enclave networks.

The HCI software OS may combine the storage that is local to each server and then pool it together into a single highly available storage system. Throughout the HCI servers, the solid state drive storage (volumes) may be created and securely delivered to hosts that run application servers associated to a secure enclave. This allows additional networks to be added by simply adding another HCI appliance. The required highly available storage and compute resources may be added to the network while maintaining the required security.

Resources may be modularized when being placed into logical units called virtual performance groups (vPGs). In one aspect, vPGs may allow specific combinations of resources to be logically grouped to provide different tiers of service. The shared storage may be distributed across the entire vPG, and each VM may utilize the performance and capacity of the entire infrastructure. VMs never have to move data just because a VM was moved on the hypervisor. By leveraging the resources of the entire vPG, performance improves for the whole infrastructure, not just where the fastest disks or processors reside. In the multi-tenant environment, separate vPGs may be deployed for the management construct, then from where the network preside, ensuring physical isolation of management cloud applications from individual enclaves.

The system uses, e.g., a native hypervisor iSCSI interface or any suitable interface mapped to dedicated redundant 10 Gbps NICs as the backbone for all storage traffic within the vPG. Storage area network (SAN) traffic may be physically isolated from all VM and management traffic.

Network equipment may be resilient, providing multiple I/O paths, and scales with the size of the vPG. Since resilient equipment operates in active/active mode, maximum bandwidth may be provided for each VM's communication.

Network communications may be handled peer-to-peer across nodes, which means there is no master node to bottleneck traffic. The HCI software storage infrastructure load balances all storage read and write traffic between two non-connected NICs that may be called SAN0 and SAN1. This model may ensure survivability of data flow in the event of a failure, as well as load balances the storage data between links to optimize performance.

8. iDRAC may be configured to alert administrators to server issues and performs hardware server management. iDRAC may be used to initially configure computing platform 100. Once the platform is operational, iDRAC may be configured to generate log files that report on the health of the system's servers. These files are processed by a platform auditing system.

iDRAC may be a piece of hardware that resides on server motherboards. It provides a secondary monitoring system that allows the underlying hardware to be independently monitored from a UEFI subsystem. The iDRAC system also monitors and prevents hardware or BIOS changes, and allows for monitoring of hardware faults in the server platform.

The iDRAC system enables the administrator to monitor the system health of the management, application, edge servers, 102, 104, 106 of FIG. 1. One of the edge server ports contains the iDRAC capability may be exclusively connected to the infrastructure switch. iDRAC monitors the physical system for issues and hardware changes and sends alerts to an auditing and tracking tools server.

With limited access to the console, the administrator may be authorized to: view managed server health, view sensor information such as temperature, voltage, and intrusion, monitor CPU state, processor automatic throttling, and predictive failure, perform power-related operations and monitor power consumption, view log event data in the iDRAC Lifecycle Controller log, and monitor and report any hardware or system changes to the underlying subsystem.

9. The Physical network infrastructure management switch supplies network interconnectivity between the disclosed computing platform components and systems. It has no connectivity to virtualized networks 1-*n* or any external network 1-*n*.

10. A management laptop may be the sole entry point into the OOB portion of computing platform 100. The software installed on the management laptop may be used to install and set up computing platform 100, as well as complete daily administration of the OBM and auditing functions.

11. The virtualized networks VMs are the applications and services that reside within the virtualized data center. VMs are provisioned via subsystems outside the platform approval boundary and managed according to the virtualized networks and TTP standards. Internal operations of the VMs are not visible to the platform's management domain which may include a management network that is virtually separate with its own physical switch to administer all of the networks on the disclosed computing platform.

In one aspect, virtualized networks are VMs hosted on the application cluster which may include two HCI software servers running a type 1 hypervisor. This cluster may be used to provision the network, compute, and storage associated with each active and standby virtualized networks. Computing platform 100 may support more servers with additional hardware, but the servers must be installed and configured before deployment.

The users on the virtualized networks 1-*n* may have accounts which is hosted on a network VM. The virtualized network's AD domain may be administered by administrative accounts local to its AD domain. Each domain may be separate and have no connectivity to other networks.

For instance, the privileged role called network admin bravo may only need to access resources for the Bravo virtualized networks VMs. VMs and other resources are tagged, and when the admin logs on, only thee objects tagged "Bravo virtualized networks VMs" are visible.

Additionally, RBAC management tools may ensure this user only accesses Bravo virtualized networks VM's objects when coming from the known IP range/subnet. This functionality allows computing platform 100 to logically segment each virtualized networks VM set by logical boundaries.

The OBM servers cannot be accessed remotely or from any virtualized networks 1-*n*. The mission of the networks is to host services (such as AD, SharePoint, and Call Managers) for users to access.

In accordance with aspects of the present disclosure, SDN may be the foundational backbone of computing platform 100 infrastructure, providing isolated network communication inside the platform and routing functionality to services outside the data center. SDN virtualized networks leverages logical switches and distributed routers segregated by multiple controls to prevent communication between networks. Separate transport zones prevent enclave interconnectivity, and cryptographically segregates each network's network stack, preventing any cross-communication should a hypervisor zero-day vulnerability be exploited to defeat the logical separation.

Since all SDN virtualized network controls are bifurcated from the management interface, the attack vector is dramatically restricted to a separate and independent access console. The result is a robust virtualized network platform with defense-in-depth controls, allowing multi-tenancy with a high level of confidence across consolidated coalition virtualized networks.

Computing platform 100 may be configured to use SDN virtualized network to accomplish the following goals for part of the defense in depth layers of the system: provide network virtualization central to the vitality of the entire system, ensure that the traffic is separated and remains separated, provide a reliable and stable platform, provide multiple layers of protection mechanisms and seamless integration between virtual and physical devices, keep the communication paths associated with each virtualized networks 1-*n* secure from each other and from the OBM tools, provide a distributed firewall capability for each VM at the hypervisor level, implement data encryption to encrypt East/West traffic for each virtualized network 1-*n*.

Building a multi-tenant SDDC platform may pose unique security challenges. A network's VMs need a network path securely isolated from the physical switches on the network to the virtual NIC of the VM. On computing platform 100, information may flow from a virtual virtualized network to the edge server switch and external networks. This information may move over standard TCP/IP connections. Computing platform 100 may use SDN software to provide an order of magnitude to the level of separation.

SDN is the network virtualization platform used for this SDDC, delivering networking and security entirely in software, abstracted from the underlying physical infrastructure. SDN accomplishes this is by implementing a SDN abstraction of the physical network that can be controlled through software.

SDN technology is an approach to cloud computing that facilitates network management and improves network performance and monitoring. SDN addresses the static architecture of traditional networks, which is decentralized and complex, by improving flexibility and troubleshooting capabilities.

In general network implementations, SDN may be required to allow for predefined dedicated encrypted tunnels, and for the SDN process to build and maintain separation. In general, SDN centralizes network intelligence in one network component by disassociating the forwarding process of network packets (Data Plane) from the routing process (Control Plane). In accordance with aspects of the present disclosure, data plane may perform stateless forwarding and/or transformation of data packets based on tables populated by the control plane and report topology information to the control plane, and maintain packet level statistics. The data plane may be the source of truth for the physical topology and status for example, VIF location, tunnel status, and so on. For all data going to or coming from enclave resources this data is considered Data Plane traffic. The data plane may also maintain status of and handles failover between multiple links and/or tunnels. Control plane may include a communication path available only to the source code of the various products. The control plane may be split into two parts in SDN, a central control plane (CCP), which runs on the controller cluster nodes, and a local control plane (LCP), which runs on the transport nodes, adjacent to the data plane it controls.

In one embodiment, the control plane may include one or more controllers which are the brain of SDN network (in other words, where the whole intelligence is incorporated). This intelligence centralization has its own requirements for security, scalability, and elasticity.

With SDN, computing platform 100 virtualizes the network that is used by its virtualized networks 1-*n* to communicate internally. SDN manager virtual appliance and controllers reside on management servers 102 for independent management and execution of the SDN routing subsystem. This setup is pre-configured, and the administrator cannot make changes to this subsystem.

In much the same way that server virtualization programmatically creates, snapshots, deletes and restores software-based VMs, SDN network virtualization programmatically creates, snapshots, deletes, and restores software-based virtual networks prior to delivery of production environments.

With network virtualization, the functional equivalent of a network hypervisor reproduces the complete set of Layer 2 through Layer 7 networking services (for example, layers include the switch, routing, access control, firewall, and QoS). As a result, these services may be programmatically assembled using the required networking combination to produce unique, isolated virtual networks for use by each virtualized network 1-*n*.

In accordance with aspects of the present disclosure, SDN software implements three separate but integrated planes: management, control, and data. The three planes are implemented as a set of processes, modules, and agents residing on three types of nodes: manager, controller, and transport. Transport nodes are the application host instances of Hypervisor itself and the edge VM appliances on edge server 106.

The API services for SDN are on SDN Manager, providing natural isolation and protection. No SDN management API instances exist on the Application server or Edge server. Programmatic or malicious user attacks could only be launched from a Management server. Furthermore, the SDN controllers also exist on the Management server to host the central Control Plane cluster daemons.

The three planes are briefly explained in the following table, followed by more detailed information about the purpose of each:

| Plane | Description |
|---|---|
| Management | This is where administrators interact with the system to make changes, check logs, and verify configuration settings. |
| Control | This is the mechanism responsible for propagating changes implemented at the Management Plane level to the necessary components impacted by the configuration change. Consisting of only proprietary API commands, the Control Plane talks directly the hypervisor agents to manipulate data flow and monitoring. |
| Data | This context is where all VM data traffic flows. For the purposes of the disclosed computing platform, this is where all enclave traffic exists. This includes all East/West and North/South data flow inside and out of the enclave. The dedicated encrypted tunnel ensures that the data traffic from each enclave remains separated. |

By design, the traffic on all three planes is completely isolated from each other.

Figure 13:
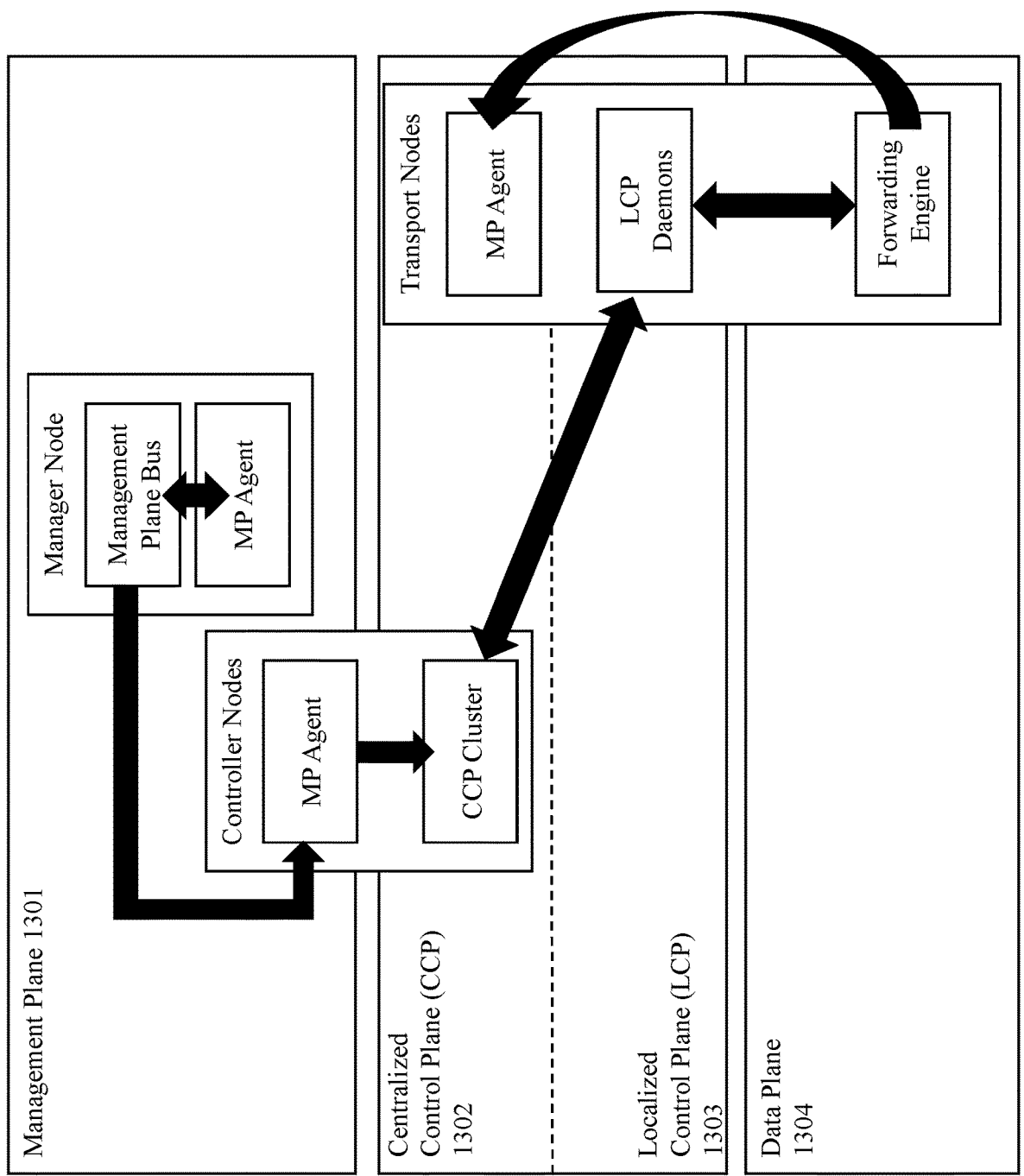
FIG. 13 illustrates three software defined networking (SDN) planes, according to an exemplary aspect of the present disclosure.

The Management Plane may always be limited to the VMs in management servers 102. As shown in FIG. 13, RBAC management tools, management, SDN Admin console, and other related management VMs are located on this management cluster, leveraging separate physical resources for compute, storage, networking interfaces, and even VLAN/IP space.

Control plane traffic may be similarly disconnected from the Management Plane 1301 via isolated networking interfaces, VLAN/IP space, and API and kernel calls. The Management Plane 1301 communicates with the Control Plane 1302 by directly interacting with the management host management ports.

The combination of the Management Plane 1301 and Control Plane 1302 dictate the transport nodes' local Control Plane daemons and forwarding engines.

In one aspect, the Management Plane 1301 may provide a single API entry point to computing platform 100, persists administrative user configuration, handles user queries, and performs operational tasks on all Management, Control, and Data Plane nodes in the system. The SDN Management Plane may include the SDN administration page, which is the single interface for all user interaction with the system. In computing platform 100, all configuration settings for the dedicated encrypted tunnel may be pre-determined, making interaction with the SDN administration page minimal. Minimal interaction means a reduced need for advanced cloud and infrastructure services training.

The separation of the Management Plane 1301 from the Control Plane 1302 may ensure that even in the event of a Management Plane failure, the configuration settings disseminated to the application hosts remain in effect and network communications continue. However, no changes to rules or traffic flow are allowed while the Management Plane 1301 is down.

Tasks achieved by the Management Plane 1301 may include configuration persistence (desired logical state), input validation, user management—role assignments, policy management, and background task tracking.

The primary purpose of the Control Plane is to disseminate configuration settings throughout computing platform 100 that were implemented in the Management Plane 1301. This is pre-configured during initial setup. The Control Plane traffic may include secure proprietary API calls made from the Admin web page to the Control Plane Hypervisor servers (in other words, the hypervisors participating in the SDN environment). The clustered controllers may be responsible for maintaining the integrity of the database in the event of a failure.

The Control Plane is split into two parts in SDN: the Central Control Plane (CCP) 1302, which runs on the SDN Controller cluster nodes, and the Local Control Plane (LCP) 1303, which runs on the transport nodes (hypervisor server) adjacent to the Data Plane it controls. The CCP 1302 may be configured to compute an ephemeral runtime state based on configuration from the Management Plane and disseminates information reported by the Data Plane elements via the local Control Plane. The LCP 1303 monitors local link status, computes most ephemeral runtime state based on updates from the Data Plane 1304 and CCP 1302, and pushes stateless configuration to forwarding engines.

The Data Plane 1304 may include all network data traffic for intra-network communications. On computing platform 100, the Data Plane 1304 performs stateless forwarding/transformation of packets based on tables populated by the Control Plane, reports topology information to the Control Plane, and maintains packet level statistics. The Data Plane 1304 is the source of truth for the physical topology and status, such as VIF (virtual interface) location, or tunnel status. Packets move from one place to another in the Data Plane 1304. The Data Plane 1304 also maintains the status of packets and handles failover between multiple links/tunnels.

The Data Plane 1304 is not necessarily fully contained in kernels, drivers, user spaces, or even specific user space processes. The Data Plane 1304 may be constrained to totally stateless forwarding based on tables/rules populated by the Control Plane. The Data Plane 1304 may also have components that maintain some amount of state for features such as TCP termination. The state managed by the Control Plane (such as MAC: IP tunnel mappings) is about how to forward the packets; whereas the state managed by the Data Plane is limited to how to manipulate payloads.

In one embodiment, computing platform 100 simplifies data encryption by enforcing encryption and authentication policies on microsegments, thus rendering network traffic sniffing useless to an attacker. This feature provides end-to-end encryption of data, including network transit. Keys are used per microsegment and isolated in the hypervisor, which removes the complexity of key management from the security administrator.

Encryption rules contain instructions that determine what to do with individual network packets based on packet properties: authenticate and encrypt, authenticate and decrypt, or only authenticate the packet. Computing platform 100 may utilize a setting that requires all intra-network traffic to be encrypted. If the packet cannot be encrypted between East/West hosts, it is dropped, and traffic is terminated.

In accordance with aspects of the present disclosure, the SDN software firewall may be one of multiple subsystems that isolate traffic, and the software firewall provides a layer of guaranteed separation. This firewall is beyond a simple perimeter—it does not allow traffic of any kind to move outside its originating network. Computing platform 100 may use micro-segmentation policies as an additional layer of protection and network isolation.

When a network is provisioned for a workload, security is persistently enforced regardless of changes in the disclosed computing platform environment. This is essential, as platform topologies may change. Networks can be re-deployed, enclave server pools can be expanded, and workloads can be moved. The one constant in the face of all this change is the network VMs, along with the need for secured separation.

Computing platform 100's implementation of the software firewall policies ensures a consistent application of network level separation regardless of the changing environment. It is important that these policies be consistently enforced regardless of IP addresses, port, protocol, OS level names, or other operational system-based changes. This persistent security is required, even considering changes of active or inactive virtualized networks 1-$n$.

Micro-segmentation gives administrators more useful ways to describe the workload. Instead of relying merely on IP addresses, administrators may describe the inherent characteristics of the workload, such as: type (web, application, or database), use (development, staging, production), and data types (low-sensitivity, financial, personally identifiable) . Computing platform 100 may combine these characteristics to define inherited policy attributes. Thus, a workload associated with one network can never communicate with other networks.

Micro-segmentation embeds security functions into computing platform 100's infrastructure itself. As such, administrators may rely on the availability of security functions for the broadest spectrum of workloads running on computing platform 100. Micro-segmentation speaks to the distributed implementation of the software firewall capability. The rules are applied at the VM object, not at any particular network or data path. Any rule applied to a VM, regardless of the workload or guest operating system, applies the rules uniformly irrespective of the location of the VM. For example, a rule that restricts certain traffic from reaching a VM will continue to function as expected even if the VM is moved from host to host or interface changes are made to the underlying system.

Micro-segmentation enables computing platform 100 administrators to extend capabilities by integrating additional security functions into their portfolio of defense. For instance, administrators might begin with stateful firewalling distributed throughout the data center but add next-gen firewall and an intrusion prevention system (IPS) for deeper traffic visibility or agentless anti-malware for better server security. Additionally, these functions cooperate to provide more effective security than if they were deployed in silos. Micro-segmentation shares intelligence between security functions, making it possible for the security infrastructure to act concertedly to tailor responses to unique situations.

Referring now back to FIG. 4, the SDN software firewall may be a distributed firewall spread over the Hypervisor host, in accordance with aspects of the present disclosure. The software firewall may enforce the security of virtualized networks traffic. Since each packet leaving a network VM is inspected by the firewall, the dedicated encrypted tunnel in computing platform 100 is able to keep network data secure and separated. The software firewall runs as a kernel service inside the Hypervisor host.

With the SDN virtualized network software firewall, a stateful firewall service for VMs is enforced. The enforcement point is at the VM virtual NIC (vNIC). Every packet that leaves the VM (before VXLAN Tunnel End Point (VTEP) encapsulation) or enters the VM (after VTEP de-encapsulation) can be inspected with a firewall policy.

The software firewall rules may be based on Layer 2 up to Layer 4 of open systems interconnection model (OSI model). With three-party vendor integration, SDN can implement security features up to and including Layer 7. Layer 2 rules are based on MAC address Layer 2 protocols, such as ARP, RARP and LLDP. Layer 3 rules are based on IP source destination, and Layer 4 uses a TCP or UDP service port.

The software firewall rules policy may be created at a central location in the hypervisor management server using the management web client. The objects are used from the management inventory. As more Hypervisor hosts are added to a hypervisor cluster, the software firewall throughput capacity is increased.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. For example, the description above may apply to a laminated glazing a well as a single glass substrate.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A system, comprising:
a first server computing device, comprising:
    a first non-transitory computer-readable storage medium configured to store a first set of instructions and application data relating to the system, and
    a first processor coupled to the first non-transitory computer-readable storage medium and configured to control a first plurality of modules to execute the first set of instructions for simultaneously establishing a plurality of logically separate and secure networks within a self-supported computing environment;
a second server computing device, comprising:
    a second non-transitory computer-readable storage medium configured to store a second set of instructions, and
    a second processor coupled to the second non-transitory computer-readable storage medium and configured to control a second plurality of modules to execute the second set of instructions for performing out-of-band management of the system; and
a third server computing device, comprising:
    a third non-transitory computer-readable storage medium configured to store a third set of instructions, and
    a third processor coupled to the third non-transitory computer-readable storage medium and configured to control a third plurality of modules to execute the third set of instructions for at least encrypting inbound and outbound data traffic of the plurality of logically separate and secure networks, and
a plurality of modules configured to prevent East/West network traffic between two virtualized networks that are simultaneously and independently operating and hosted by the first server computing device, wherein the plurality of modules include:
    at least one software defined networking virtualized network encapsulation module, at least one network encryption component configured to protect data routing within the third server computing device and provide East/West virtualized network traffic encryption, and at least one dedicated encrypted tunnels specific protection rules module to restrict data flows between two virtual machines not collocated on a same virtualized network, wherein the system is scalable by at least adding additional one or more first server computing devices to host additional application data within the self-supported computing environment's secure configuration and logical separation of networks while maintaining the second and third server computing devices.

2. The system of claim 1, further comprising:

a plurality of network interface controllers (NIes) configured to connect each of the first, second, and third server computing devices to provide network access for virtual machines of each of the plurality of logically separate and secure networks within the self-supported computing environment.

3. The system of claim 1, further comprising one or more data switches configured to connect with two or more second server computing devices, wherein the one or more data switches are provisioned with access control list rules to establish exception-only-traffic of data and network between the two or more first server computing devices.

4. The system of claim 1, further comprising a dedicated encrypted tunnel established between the first and third server computing devices to prevent data associated with each of the plurality of logically separate and secure networks from traversing outside a logical boundary of each respective network.

5. The system of claim 4, wherein the third server computing device is further configured to include:

at least one network specific edge INC for providing a connection with one of the plurality of logically separate and secure networks;

at least one network specific virtual switch for providing a virtual connectivity to an assigned virtualized network;

at least one network specific service router for directing traffic in accordance with approved ports, protocols, and services;

at least one network specific logical switch for providing a connectivity between the at least one network specific service router and software defined networking routing on the third server computing device; and at least one network specific encryption module configured to provide data routing within the third server computing device and East/West to North/South virtualized encryption; and at least one network specific Tier 1 router configured to provide data North/South encapsulation and routing within the third server computing device.

6. The system of claim 4, wherein the first server computing device is further configured to include:

at least one network specific logical switch for providing connectivity between the at least one network specific service router and software defined networking routing on the third server computing device;

at least one network specific encryption module configured to provide data routing within the first server computing device and virtualized network encryption;

at least one network specific Tier 1 router configured to provide data North/South routing within the first server computing device; and at least one network specific virtual machine.

7. The system of claim 1, further comprising a booting system integrated with a unified extensible firmware interface and configured to protect the first, second and third computing server devices.

8. The system of claim 1, wherein the booting system is further configured to monitor real-time alteration to virtualization software respectively associated with each of the first, second and third computing server devices, and reboot the first, second or third computing server device in response to detecting a change to a corresponding virtualization software.

9. The system of claim 8, further comprising a role based access control (RBAC) rights management module configured to routinely scan virtualization software respectively associated with each of the first, second and third computing server devices and generate an alert in response to detecting an alteration or configuration drift in a corresponding virtualization software.

10. A non-transitory computer-readable storage medium having instructions embodied therein that when executed cause a computer system to perform:

storing a first set of instructions and application data relating to the computer system on a first non-transitory computer-readable storage medium of a first server computing device of the computer system;

executing the first set of instructions, by a first processor of the first server computing device coupled to the first non-transitory computer-readable storage medium, to simultaneously establish a plurality of logically separate and secure networks within a self-supported computing environment;

storing a second set of instructions on a second non-transitory computer-readable storage medium of a second server computing device of the computer system;

executing the second set of instructions, by a second processor of the second server computing device coupled to the second non-transitory computer-readable storage medium, to perform out-of-band management of the system;

storing a third set of instructions on a third non-transitory computer-readable storage medium of a third server computing device of the computer system;

executing the third set of instructions, by a third processor of the third server computing device coupled to the third non-transitory computer-readable storage medium, to at least encrypt inbound and outbound data traffic of the plurality of logically separate and secure networks;

providing a plurality of modules to prevent East/West network traffic between two virtualized networks that are simultaneously and independently operating and hosted by the first server computing device, wherein the plurality of modules include:

at least one software defined networking virtualized network encapsulation module, at least one network encryption component configured to protect data routing within the third server computing device and provide East/West virtualized network traffic encryption, and at least one dedicated encrypted tunnels specific protection rules module to restrict data flows between two virtual machines not collocated on a same virtualized network; and adding additional one or more first server computing devices to the computer system to host additional application data within the self-supported computing environment's secure configuration and logical separation of networks while maintaining the second and third server computing devices.

11. The non-transitory computer-readable storage medium of claim 10, further comprising instructions for connecting, by a plurality of network interface controllers (NICs) each of the first, second, and third server computing devices to provide network access for virtual machines of each of the plurality of logically separate and secure networks within the self-supported computing environment.

12. The non-transitory computer-readable storage medium of claim 10, further comprising instructions for connecting one or more data switches with two or more second server computing devices, and provisioning the one or more data switches with access control list rules to establish exception-only-traffic of data and network between the two or more first server computing devices.

13. The non-transitory computer-readable storage medium of claim 10, further comprising instructions for providing a dedicated encrypted tunnel established between the first and third server computing devices to prevent data associated with each of the plurality of logically separate and secure networks from traversing outside a logical boundary of each respective network.

14. The non-transitory computer-readable storage medium of claim 13, wherein the third server computing device is further configured to include:
   at least one network specific edge NIC for providing a connection with one of the plurality of logically separate and secure networks;
   at least one network specific virtual switch for providing a virtual connectivity to an assigned virtualized network;
   at least one network specific service router for directing traffic in accordance with approved ports, protocols, and services;
   at least one network specific logical switch for providing a connectivity between the at least one network specific service router and software defined networking routing on the third server computing device; and
   at least one network specific encryption module configured to provide data routing within the third server computing device and East/West to North/South virtualized encryption; and
   at least one network specific Tier 1 router configured to provide data North/South encapsulation and routing within the third server computing device.

15. The non-transitory computer-readable storage medium of claim 13, wherein the first server computing device is further configured to include:
   at least one network specific logical switch for providing a connectivity between the at least one network specific service router and software defined networking routing on the third server computing device;
   at least one network specific encryption module configured to provide data routing within the first server computing device and virtualized network encryption;
   at least one network specific Tier 1 router configured to provide data North/South routing within the first server computing device; and
   at least one network specific virtual machine.

16. The non-transitory computer-readable storage medium of claim 10, further comprising instructions for providing a booting system integrated with a unified extensible firmware interface and configured to protect the first, second and third computing server devices.

17. The non-transitory computer-readable storage medium of claim 16, wherein the booting system is further configured to monitor real-time alteration to virtualization software respectively associated with each of the first, second and third computing server devices, and reboot the first, second or third computing server device in response to detecting a change to a corresponding virtualization software.

18. The non-transitory computer-readable storage medium of claim 10, further comprising instructions for providing a role based access control (RBAC) rights management module configured to routinely scan virtualization software respectively associated with each of the first, second and third computing server devices and generate an alert in response to detecting an alteration or configuration drift in a corresponding virtualization software.

\* \* \* \* \*